US008446875B2

(12) United States Patent
Taniuchi et al.

(10) Patent No.: US 8,446,875 B2
(45) Date of Patent: May 21, 2013

(54) MEDIA INDEPENDENT PRE-AUTHENTICATION SUPPORTING FAST-HANDOFF IN PROXY MIPV6 ENVIRONMENT

(75) Inventors: Kenichi Taniuchi, Kawasaki (JP); Ashutosh Dutta, Bridgewater, NJ (US); Victor Fajardo, Robbinsville, NJ (US); Yoshihiro Oba, Englewood Cliffs, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 975 days.

(21) Appl. No.: 11/972,621

(22) Filed: Jan. 11, 2008

(65) Prior Publication Data

US 2008/0207206 A1    Aug. 28, 2008

Related U.S. Application Data

(60) Provisional application No. 60/891,349, filed on Feb. 23, 2007.

(51) Int. Cl.
*H04W 36/00* (2009.01)

(52) U.S. Cl.
USPC ............ 370/331; 455/436; 455/437; 455/438

(58) Field of Classification Search
USPC .. 370/310, 329, 330, 331, 350, 351; 455/436, 455/437, 438, 439, 442, 443
See application file for complete search history.

(56) References Cited

U.S. PATENT DOCUMENTS

| 7,046,647 | B2 * | 5/2006 | Oba et al. ...................... 370/331 |
| 2004/0136348 | A1 * | 7/2004 | Han .............................. 370/338 |
| 2005/0177723 | A1 | 8/2005 | Huang et al. |
| 2007/0014262 | A1 | 1/2007 | Gras et al. |
| 2007/0109997 | A1 | 5/2007 | Hong et al. |
| 2007/0189218 | A1 * | 8/2007 | Oba et al. ...................... 370/331 |
| 2008/0165735 | A1 * | 7/2008 | Chen et al. .................... 370/331 |

FOREIGN PATENT DOCUMENTS

WO    WO 2005053187 A1 *    6/2005
WO    2006-083039 A1    8/2006

OTHER PUBLICATIONS

Dutta, A. et al. "A Framework of Media-Independent Pre-Authentication (MPA)" Internet Draft, Version 1, Jul. 17, 2005.*
Gundavelli, S., "Proxy Mobile IPv6," (draft-sgundave-mipv6-proxymipv6-00); (work in progress), Oct. 16, 2006.

(Continued)

*Primary Examiner* — Dang Ton
*Assistant Examiner* — Robert M Morlan
(74) *Attorney, Agent, or Firm* — Westerman, Hattori, Daniels & Adrian, LLP

(57) ABSTRACT

This document describes a proactive mechanism to provide fast-handover involving PMIPv6. In particular, it describes how one can achieve fast handoff for PMIPv6 using Media-independent Pre-Authentication (MPA) technique. It discusses the need for a fast-handoff for PMIPv6 environment. It then describes how MPA techniques could be used during different steps involving both intra-domain and inter-domain handoff for PMIPv6. MPA-based fast-handover takes advantage of the pre-authentication mechanism so that the mobile can perform the access authentication while in the previous local mobility (PMA) domain and thus would be able to complete many of the handoff related operations while still in the previous network.

23 Claims, 24 Drawing Sheets

OTHER PUBLICATIONS

Obha, Y., A Framework of Media-Independent Pre-Authentication (MPA) (draft-ohba-mobopts-mpa-framework-03); (work in progress). Oct. 22, 2006.

Obha, Y., "Media-Independent Pre-Authentication (MPA) Implementation Results," (draft-ohba-mobopts-mpa-implementation-03 (work in progress), Oct. 2006.

Kempf, J., Problem Statement for IP Local Mobility (draft-kennpf-netlmm-nohost-ps-01.txt); Jan. 2006.

Kempf. J., Requirements and Gap Analysis for IP Local Mobility (draft-kempf-netlmm-nohost-req-00.txt), Jul. 2005.

Forsberg, D., "Protocol for Carrying Authentication for Network Access (PANA)," draft-ieff-pana-pana-13 (work in progress), Dec. 2006.

International Search Report, Jun. 1, 2009, p. 1-7.

Canadian Office Action dated Mar. 28, 2012, issued in corresponding Canadian Patent Application No. 2,679,202 (3 pages).

Japanese Office Action dated Jan. 31, 2012, issued in corresponding Japanese Patent Application No. 2009-550606.

Supplementary European Search Report dated Mar. 21, 2013, issued in corresponding European Patent Application No. 08726023.8.

* cited by examiner

MEDIA INDEPENDENT PRE-AUTHENTICATION SUPPORTING FAST-HANDOFF IN PROXY MIPV6 ENVIRONMENT

The present application claims priority under 35 U.S.C. 119 as a non-provisional of U.S. provisional application Ser. No. 60/891,349, filed on Feb. 23, 2007, the entire disclosure of which is incorporated herein by reference.

BACKGROUND

Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Overview of MPA:

Details related to Media Independent Pre-Authentication (MPA) are set forth in reference [I-D.ohba-mobopts-mpa-framework] and [I-D.ohba-mobopts-mpa-implementation] below and in the following patent applications, the entire disclosures of which are each incorporated by reference herein: (1) U.S. patent application Ser. No. 11/307,362, filed Feb. 2, 2006, entitled A Framework of Media Independent Pre-authentication; (2) U.S. application Ser. No. 11/308,175, filed on Mar. 9, 2006 entitled Framework of Media Independent Pre-Authentication (Support for PANA); (3) U.S. application Ser. No. 11/279,856, filed Apr. 14, 2006, entitled Framework of Media Independent Pre-Authentication Improvements: Including Considerations for Failed Switching and Switchback; and (4) U.S. patent application Ser. No. 11/567,134, filed on Dec. 5, 2006, entitled MPA Improvements Relate to Pre-Fetching of IP Addresses.

MPA is a mobile-assisted higher-layer authentication, authorization and handover scheme that is performed prior to establishing layer 2 associations to a network (where mobile may move in near future). It provides a secure and seamless mobility optimization that works for inter-domain handover and heterogeneous handover involving both single interface and multiple interfaces. MPA is a set of techniques/algorithms that are executed to ensure seamless handover and connectivity to the target network by performing pre-configuration and pre-authentication to the target network before the actual handover takes place. It can be used to enhance the performance of existing mobility protocols by performing the proactive layer 3 and layer 4 associations and bindings before the actual handover actually takes place, thereby saving time for these operations that usually take place after the layer 2 association. Even the layer 2 handover is enhanced by suppressing the 802.11 AP channel scanning and best AP selection at the interface driver by having prior information of the channel number of the selected target network SSID (done for the sake of a proof of concept). So association to the target network avoids channel scanning, detection of the PoA MAC address and appropriate channel selection.

MPA Framework:

For reference, FIG. 18 shows some of the functional components that are part of media independent pre-authentication and provide proactive pre-authentication, pre-configuration and proactive handover tunneling techniques.

More particularly, media-independent Pre-Authentication (MPA) is a mobile-assisted, secure handover optimization scheme that works over any link-layer and with any mobility management protocol. With MPA, a mobile node is not only able to securely obtain an IP address and other configuration parameters from a candidate target network, but also able to send and receive IP packets using the obtained IP address and other configuration parameters, before it attaches to the candidate target network when the candidate target network becomes the target network. This makes it possible for the mobile node to complete the binding update of any mobility management protocol and use the new care-of address before performing a handover at link-layer.

This functionality is provided by allowing a mobile node, which has a connectivity to the current network but is not yet attached to a candidate target network, to (i) establish a security association with the candidate target network to secure the subsequent protocol executions, then (ii) securely execute a configuration protocol to obtain an IP address and other configuration parameters from the candidate target network as well as a tunnel management protocol to establish a bidirectional tunnel between the mobile node and an access router of the candidate target network, then (iii) send and receive IP packets, including signaling messages for binding update of a mobility management protocol and data packets transmitted after completion of binding update, over the tunnel using the obtained IP address as the tunnel inner address, and finally (iv) deleting or disabling the tunnel immediately before attaching to the candidate target network when it becomes the target network and then re-assigning the inner address of the deleted or disabled tunnel to its physical interface immediately after the mobile node is attached to the target network through the interface. Instead of deleting or disabling the tunnel before attaching to the target network, the tunnel may be deleted or disabled immediately after attached to the target network.

Especially, the third procedure makes it possible for the mobile to complete higher-layer handover before starting link-layer handover. This means that the mobile is able to send and receive data packets transmitted after completion of binding update over the tunnel, while it is still able to send and receive data packets transmitted before completion of binding update outside the tunnel.

In the above four basic procedures of MPA, the first procedure is referred to as "pre-authentication", the second procedure is referred to as "pre-configuration", the combination of the third and fourth procedures are referred to as "secure proactive handover." The security association established through pre-authentication is referred to as an "MPA-SA." The tunnel established through pre-configuration is referred to as a "proactive handover tunnel."

In the MPA framework, the following functional elements are expected to reside in each candidate target network to communicate with a mobile node: Authentication Agent (AA), Configuration Agent (CA) and Access Router (AR). Some or all of those elements can be placed in a single network device or in separate network devices.

An authentication agent is responsible for pre-authentication. An authentication protocol is executed between the mobile node and the authentication agent to establish an MPA-SA. The authentication protocol must be able to derive a key between the mobile node and the authentication agent, should be able to provide mutual authentication. The authentication protocol should be able to interact with a AAA protocol such as RADIUS and Diameter to carry authentication credentials to an appropriate authentication server in the AAA infrastructure. The derived key is used for further deriving keys used for protecting message exchanges used for pre-configuration and secure proactive handover. Other keys that are used for bootstrapping link-layer and/or network-layer ciphers MAY also be derived from the MPA-SA.

A configuration agent is responsible for one part of pre-configuration, namely securely executing a configuration protocol to securely deliver an IP address and other configuration parameters to the mobile node. The signaling messages of the configuration protocol must be protected using a key derived from the key corresponding to the MPA-SA.

An access router is a router that is responsible for the other part of pre-configuration, i.e., securely executing a tunnel management protocol to establish a proactive handover tunnel to the mobile node, and secure proactive handover using the proactive handover tunnel. The signaling messages of the configuration protocol must be protected using a key derived from the key corresponding to the MPA-SA. IP packets transmitted over the proactive handover tunnel should be protected using a key derived from the key corresponding to the MPA-SA.

In some of the preferred embodiments described herein, systems and methods are described to proactively establish higher layer and lower layer contexts of different media. Here, media includes, e.g., the available networks accessible to mobile devices (e.g., wired, wireless licensed, wireless unlicensed, etc.). See, e.g., media discussed in I.E.E.E. 802, including I.E.E.E. 802.21. Media may include, e.g., wireless LAN (e.g., I.E.E.E. 802.11), I.E.E.E. 802.16, I.E.E.E. 802.20, Bluetooth, etc. Some illustrative examples include: 1) a mobile device switching from a cellular network to a wireless or WIFI network, such as, e.g., a cell phone with cellular interface and wireless interface trying to get WIFI access by obtaining information (e.g., keys, etc.) initially over the cellular network, rather than simultaneously establishing a wireless interface; 2) where a mobile device currently has wireless or WIFI connectivity, where the wireless LAN may potentially shut down quickly or the like, in which case, by way of example, the mobile device can proactively do pre-authentication via cellular network (i.e., so as to enable a quick switch if needed). In some illustrative cases, a mobile node with a single IEEE 802.xx interface may roam among multiple subnets and multiple administrative domains. While keeping multiple interfaces always-on is an option, a mobile node may want to deactivate unused interfaces in some instances (such as, e.g., to save power, etc.). In addition, MPA can provide, among other things, secure and seamless mobility optimization that works for inter-subnet handoff, inter-domain handoff, inter-technology handoff, etc., as well as the use of multiple interfaces.

Media Independent Handover Services:

In I.E.E.E. P802.21/D.01.09, September 2006, entitled Draft IEEE Standard for Local and Metropolitan Area Networks: Media Independent Handover Services, among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems. The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note that here "media" refers to method/mode of accessing a telecommunication system (e.g. cable, radio, satellite, etc.), as opposed to sensory aspects of communication (e.g. audio, video, etc.). See, e.g., 1.1 of I.E.E.E. P802.21/D.01.09, September 2006, entitled Draft IEEE Standard for Local and Metropolitan Area Networks: Media Independent Handover Services. See Id.

Network-Based Localized Mobility Management:

As described below, goals for local mobility management are described in I.E.T.F. Internet Draft, by J. Kempf, Goals for Network-based Localized Mobility Management (NETLMM), Document: draft-ietf-netlmm-nohost-req-02.txt, June, 2006.

As described in said reference, the basic problems that occur when a global mobility protocol is used for managing local mobility are described, and two currently used approaches to localized mobility management—the host-based approach that is used by most IETF protocols, and the proprietary Wireless LAN (WLAN) switch approach used between WLAN switches in different subnets—are examined. The conclusion from the problem statement document is that none of the approaches has a complete solution to the problem. While the WLAN switch approach is most convenient for network operators and users because it requires no software on the mobile node other than the standard drivers for WiFi, the proprietary nature limits interoperability, and the restriction to a single last-hop link type and wired backhaul link type restricts scalability. The IETF host-based protocols require host software stack changes that may not be compatible with all global mobility protocols. They also require specialized and complex security transactions with the network that may limit deployability. The conclusion is that a localized mobility management protocol that is network based and requires no software on the host for localized mobility management is desirable.

This reference develops a brief functional architecture and detailed goals for a network-based localized mobility management protocol (NETLMM). In addition, the document sets forth the following terminology:

Localized Mobility Management Domain:

An Access Network in the sense defined in [1] in which mobility is handled by the NETLMM protocol.

Mobile Access Gateway:

A Mobile Access Gateway (MAG) is a functional network element that terminates a specific edge link and tracks mobile node IP-level mobility between edge links, through NETLMM signaling with the Localized Mobility Anchor. The MAG also terminates host routed data traffic from the Localized Mobility Anchor for mobile nodes currently located within the edge link under the MAG's control, and forwards data traffic from mobile nodes on the edge link under its control to the Localized Mobility Anchor.

Local Mobility Anchor:

A Local Mobility Anchor (LMA) is a router that maintains a collection of host routes and associated forwarding information for mobile nodes within a localized mobility management domain under its control. Together with the MAGs associated with it, the LMA uses the NETLMM protocol to manage IP node mobility within the localized mobility management domain. Routing of mobile node data traffic is anchored at the LMA as the mobile node moves around within the localized mobility management domain.

The references describes the following NETLMM Functional Architecture having the following components. Localized Mobility Anchors (LMAs) within the backbone network maintain a collection of routes for individual mobile nodes within the localized mobility management domain. The routes point to the Mobile Access Gateways (MAGs) managing the links on which the mobile nodes currently are located. Packets for a mobile node are routed to and from the mobile node through tunnels between the LMA and MAG. When a mobile node moves from one link to another, the MAG sends a route update to the LMA. While some mobile node involvement is necessary and expected for generic mobility functions such as movement detection and to inform the MAG about mobile node movement, no specific mobile-node-to-network protocol will be required for localized mobility management itself. Host stack involvement in mobility management is thereby limited to generic mobility functions at the IP layer, and no specialized localized mobility management software is required.

Proxy Mobile IPv6:

An illustrative overview of Proxy Mobile IPv6 (PMIPv6) is explained in Problem Statement for Common Interface Support in Localized Mobility Management, I.E.T.F., draft-corujo-ps-common-interfaces- lmm-01, July, 2007, D. Corujo, et al. In this document, it is indicated that PMIPv6 is a network-based mobility management protocol aimed at local mobility support, while reusing when possible Mobile IPv6 (MIPv6) [RFC3775] entities and concepts. In this protocol the mobile nodes (MN), are differentiated by an identifier (e.g., NAI), which has an associated set of information stored on the network, such as a profile containing the home prefix. This information is typically kept in a policy store (e.g., AAA), accessible by all the PMIPv6 entities in the LMD. PMIPv6 assumes that upon L2 network attachment, the node is authenticated. This attachment provides the necessary information (e.g., the nodes NAI) to ensure that the network is able to retrieve the Home Network prefix. The prefix will then be used in Router Advertisements to the node, informing that it is on the Home Domain. In this scenario the MN configures its Home Address on the network interface, even when roaming across foreign networks, transforming the visited LMD into a single link, from the node's point of view.

The Proxy Mobile Agent (PMA), located in the access router, performs signaling on behalf of the node and is also the entity that retrieves the MN information and sends the customized Router Advertisements, emulating the home network behavior. The PMA mobility signaling consists on Binding Updates to the MN's Home Agent, informing the HA that the current Care-of Address of the registered MN is the PMA's address. These procedures also lead to the establishment of tunnels between HA and PMA.

Illustrative Architecture:

FIG. 19 depicts some illustrative architectural components that can be employed in some illustrative and non-limiting implementations including wireless access points to which client devices communicate. In this regard, FIG. 19 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 20 shows an illustrative computer or control unit that can be used to implement computerized process steps, to be carried out by devices, such as, e.g., an access point, a user station, a source node or destination node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Background References:

The following background references are incorporated herein by reference in their entireties as though recited herein in full.

1. Gundavelli, S., "Proxy Mobile IPv6", draft-sgundave-mipv6-proxvmipv6-00 (work in progress), October 2006. Referred to herein as [I-D.sgundave-mipv6-proxymipv6].

2. Ohba, Y., "A Framework of Media-Independent Pre-Authentication (MPA)", draft-ohba-mobopts-mpa-framework-03 (work in progress), October 2006. Referred to herein as [I-D.ohba-mobopts-mpa-framework].

3. Ohba, Y., "Media-Independent Pre-Authentication (MPA) Implementation Results", draft-ohba-mobopts-mpa-implementation-03 (work in progress), October 2006. Referred to herein as [I-D.ohba-mobopts-mpa-implementation].

4. Kempf, J., "Problem Statement for IP Local Mobility", draft-kempf-netlmm-nohost-ps-01 (work in progress), January 2006. Referred to herein as [I-D.kempf-netlmm-nohost-ps].

5. Kempf, J., "Requirements and Gap Analysis for IP Local Mobility", draft-kemPf-netlmm-nohost-reg-00 (work in progress), July 2005. Referred to herein as [I-D.kempf-netlmm-nohost-req].

6. Forsberg, D., "Protocol for Carrying Authentication for Network Access (PANA)", draft-ietf-pana-pana-13 (work in progress), December 2006. Referred to herein as [I-D.ietf-pana-pana].

7. "Draft IEEE Standard for Local and Metropolitan Area Networks: Media Independent Handover Services, IEEE P802.21/D000.04," February 2007. Referred to herein as [802.21].

SUMMARY

The preferred embodiments of the present invention improve upon the foregoing and other background technologies.

This preferred embodiments of the present application describes a proactive mechanism to provide fast-handover involving PMIPv6. In particular, the preferred embodiments describe how one can achieve fast handoff for PMIPv6 using the Media-independent Pre-Authentication (MPA) technique. In some embodiments, MPA techniques can be used during different steps involving both intra-domain and inter-domain handoff for PMIPv6. MPA-based fast-handover takes advantage of the pre-authentication mechanism so that the mobile can perform the access authentication while in the previous local mobility (PMA) domain and thus would be able to complete many of the handoff related operations while still in the previous network.

According to some embodiments, a method for optimizing handover in a PMIPv6 environment of a mobile node between access routers having proxy mobile agents (PMA) located within at least one localized mobility management domain having a corresponding localized mobility anchor (LMA/HA), comprising: employing media-independent pre-authentication (MPA) supporting fast-handoff of a mobile node between a first proxy mobile agent (PMA) of a first access router and a second proxy mobile agent (PMA) of a second access router. In some examples, the method includes having the first proxy mobile agent and the second proxy agent located in a same domain for intra-domain handover, and in some examples, the method includes having the first proxy mobile agent and the second proxy agent located in different domains for inter-domain handover.

According to some preferred embodiments, a system for optimizing handover in a PMIPv6 environment of a mobile node between access routers having proxy mobile agents (PMA) located within at least one localized mobility management domain having a corresponding localized mobility anchor (LMA/HA), comprising: a mobile node equipped with a client MIPv6 and configured to perform media-independent pre-authentication (MPA) supporting fast-handoff of the mobile node between a first proxy mobile agent (PMA) of a first access router and a second proxy mobile agent (PMA) of a second access router.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 3(*b*) is a diagram showing an indirect pre-authentication phase according to some illustrative examples;

DISCUSSION OF THE PREFERRED EMBODIMENTS

Figure 1:
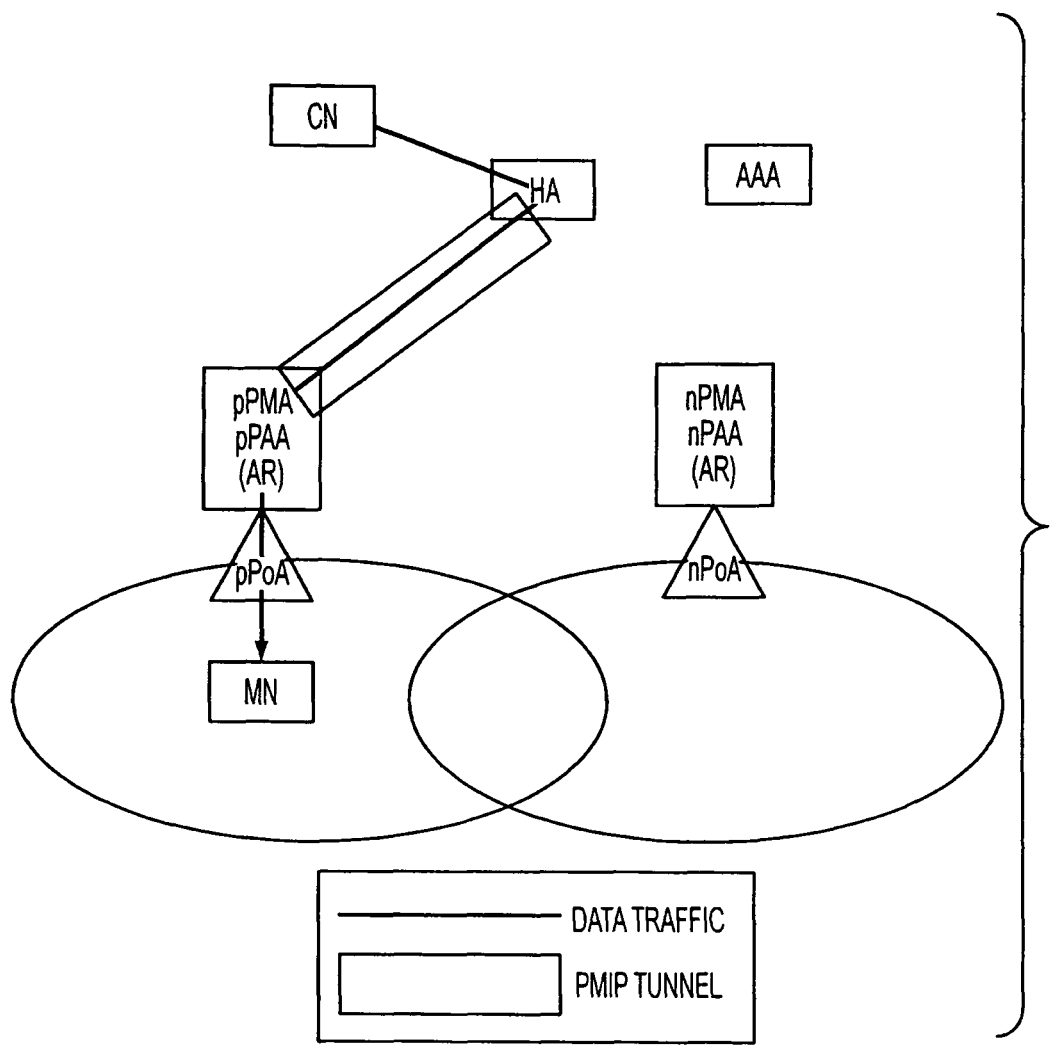
FIG. 1 shows an initial bootstrapping scenario, where the mobile (MN) boots up in a cell that is under PPMA according to some illustrative examples.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction:

The goals for local mobility management have duly been documented in the no-host-requirement draft. See, e.g., I.E.T.F. Internet Draft, by J. Kempf, Goals for Network-based Localized Mobility Management (NETLMM), Document: draft-ietf-netlmm-nohost-req-02.txt, June, 2006, incorporated herein as part of the priority provisional application, incorporated herein. For additional background, the entire disclosures of the following references are incorporated herein by reference: (1) U.S. patent application Ser. No. 11/307,362, filed Feb. 2, 2006, entitled A Framework of Media Independent Preauthentication; (2) U.S. application Ser. No. 11/308,175, filed on Mar. 9, 2006 entitled Framework of Media Independent Pre-Authentication (Support for PANA); and (3) U.S. application Ser. No. 11/279,856, filed Apr. 14, 2006, entitled Framework of Media Independent Pre-Authentication Improvements: Including Considerations for Failed Switching and Switch back.

One advantage of local mobility management is to optimize many of the functions related to mobility and reduce the number of signaling messages over the air. In network localized mobility management paradigm, when the mobile moves from one MAG to another MAG, and its movement is limited within one LMA, the following operations must be performed. It can broadly be classified into few steps such as layer 2 movement, detection of new link (DNA), router solicitation (RS), access authentication, profile verification, proxy binding update and address re-configuration. It also extends the paradigm so that the mobile can move between two LMAs for inter-domain case. LMA nomenclature can be interchanged with HA and MAG can be interchanged with PMA in this document.

We now describe some of the steps involved during network localized movement in detail.

1) Link layer signaling required for handover and re-authentication. For example, in 802.11, this is the ReAssociate message together with 802.1x re-authentication using EAP.

2) Active IP level movement detection, including router reachability: The DNA (detecting network attachment) protocol uses Router Solicitation/Router Advertisement for this purpose. In addition, if SEND is used and the mobile node does not have a certificate cached for the router, the mobile node must use Certification Path Solicitation/Certification Path Advertisement to obtain a certification path.

3) Once the movement detection is complete, the mobile will need to configure its IP address based on the prefix advertisement from the MAG. But if the prefix is the same as the old prefix it gets configured with the same IP address.

4) But the mobile still goes through the process of re-authentication in the new point-of attachment. After the re-authentication is complete, it will trigger the establishment of the tunnel between the MAG (PMA) and the LMA (HA). Thus, any traffic destined to the mobile node will be sent over the tunnel and will be delivered to the mobile.

If this movement is extended to inter-domain movement, then the PMAs (MAGs) will belong to two different LMA. The respective LMAs can also be called as PPMA and nPMA.

Motivation for Fast-Handoff:

It appears at least from the current version of PMIP draft [I-D.sgundave-mipv6-proxymipv6] that the mobile during its movement within a PMIP domain (when it moves from one PMA link to another PMA link), it still goes through an IP address configuration process, even though it does not change its IP address in the new link. Thus, let us say for stateless auto-configuration mode, things like, sending a Router Solicitation (RS) upon detecting network attachment (DNA) (in case of link change), obtaining a home prefix from the router (PMA) and configuring an address (by appending its link-layer address with the prefix) are mandatory even if the new address generated is same as the address it had in the old PMA link. Thus, it is almost similar to re-initiating the address configuration process. In addition, LMA takes some time to be able to complete the proxy binding update and set up the tunnel between PMA and HA. Thus, even if the handoff delay is reduced compared to the global mobility protocol, and there is less signaling exchange over the air, there is still an appreciable amount of delay due to other components involved in the process. These components include access authentication, profile verification, home address reconfiguration and binding update. Things appear to be more complicated and take more time for inter-domain case, as it involves two home agents in each domain and the home prefix advertisement is different in each domain.

The preferred embodiments herein reduce the delay due to access authentication, tunnel setup, binding update and media forwarding by applying the media independent pre-authentication techniques for both intra-domain and inter-domain cases.

As described herein, Media Independent pre-authentication techniques (see reference [I-D.ohba-mobopts-mpa-framework] above) can also provide a proactive fast-handoff technique for PMIPv6. Some of the results using MPA framework can be found in the above noted reference [I-D.ohba-mobopts-mpa-implementation].

Details of MPA-Assisted Fast-Handoff for Pmipv6 (Proxy Mobile Ipv6):

The present application provides mechanisms by which both intra-domain and inter-domain handoff delays are reduced, thereby reducing the packet loss as well when the mobile is subjected to ProxyMIp handoff. We cover the mechanisms associated with both the handoff cases. In intra-domain case, the mobile moves between the PMAs that are under the same LMA. Thus both the PMAs send the same home prefix as part of their router advertisement.

During an Inter-domain case, the LMAs are different. Thus, each of the PMAs belonging to each LMA send a different prefix as part of the router advertisement. We describe how MPA can help speed up the handoff for both the cases in details.

I. Intra-Domain Movement:

In this section, we describe the MPA procedures that are needed to support fast-handoff thereby reducing the packet loss when the movement is limited to intra-domain case.

Initial State (e.g., Bootstrapping State):

FIG. 1 shows an initial bootstrapping scenario, where the mobile (MN) boots up in a cell that is under PPMA. Both PPMA and nPMA are under the same LMA which is the HA (Home Agent) in this case. When the mobile is connected to the pPoA, it completes the access authentication procedure by sending its NAI and other profile related to mobile to the PPMA. PPMA actually does co-exist with the access router PAR in this case. We also assume that the first hop access router is equipped with other layer 3 authentication agent such as PAA (PANA Authentication Agent) (see, e.g., reference [I-D.ietf-pana-pana] above).

As part of the initial access authentication, the mobile can perform an EAP by communicating with the local authenticator PAA and the AAA server. After the initial authentication is over, the PMA gets the home prefix for the mobile and sends it as part of the router advertisement. After the mobile gets the home prefix, it configures itself with the home address HoA and then configures its default router to be PMA. At this point the PMA sends the proxy binding update to the HA on behalf of the mobile. The tunnel gets created between the PPMA and the HA after the binding update procedure is complete. Data from any host destined to the mobile will be intercepted by the HA, and the HA will send this data to PPMA. This data will have the current IP addressing scheme. Outer tunnel will have a source address HA and destination address PPMA. The inner data will have the source address ANY and the inner address HoA. Once PPMA gets this data, it will strip off the outer header and deliver the inner data to the mobile.

Here, the data delivery path can be shown as follows:

Data Packet, ANY->HoA;

PMIP Tunnel, Outer HA->PPMA, Inner ANY->HoA.

Figure 2:
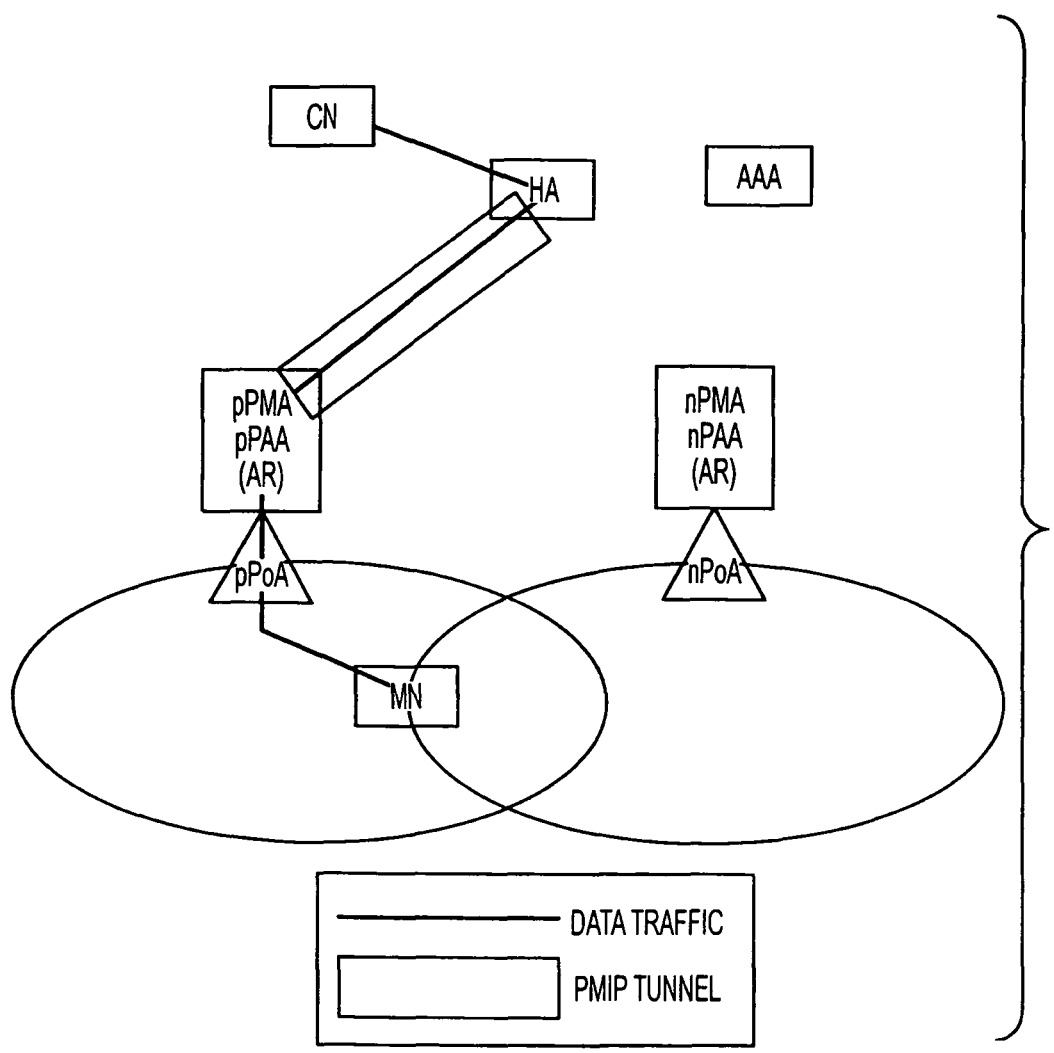
FIG. 2 shows the scenario as the mobile starts to move away from the current point of attachment (pPoA) according to some illustrative examples.

Mobile Starts Moving (Mobile is Impending to Move):

FIG. 2 shows the scenario as the mobile starts to move away from the current point of attachment (pPoA). When the mobile tries to move away from the pPoA, it prepares the pre-authentication process. The mobile can use any technique to determine that it is moving away from the current point of attachment. For example, a mobile can use IEEE 802.21-based event service commands to determine that it is impending to move away (see, e.g., reference [802.21] above).

Pre-Authentication Phase:

During the pre-authentication phase, the mobile can complete the layer 3 and layer 2 authentication while still in the previous network, thereby reducing the time due to pre-authentication. There are basically two types of authentication, such as direct authentication and indirect authentication. In case of direct authentication the mobile can communicate with nPMA directly, but in case of indirect authentication, PPMA acts like a proxy. We describe both the cases, direct pre-authentication and indirect pre-authentication.

Figure 3A:
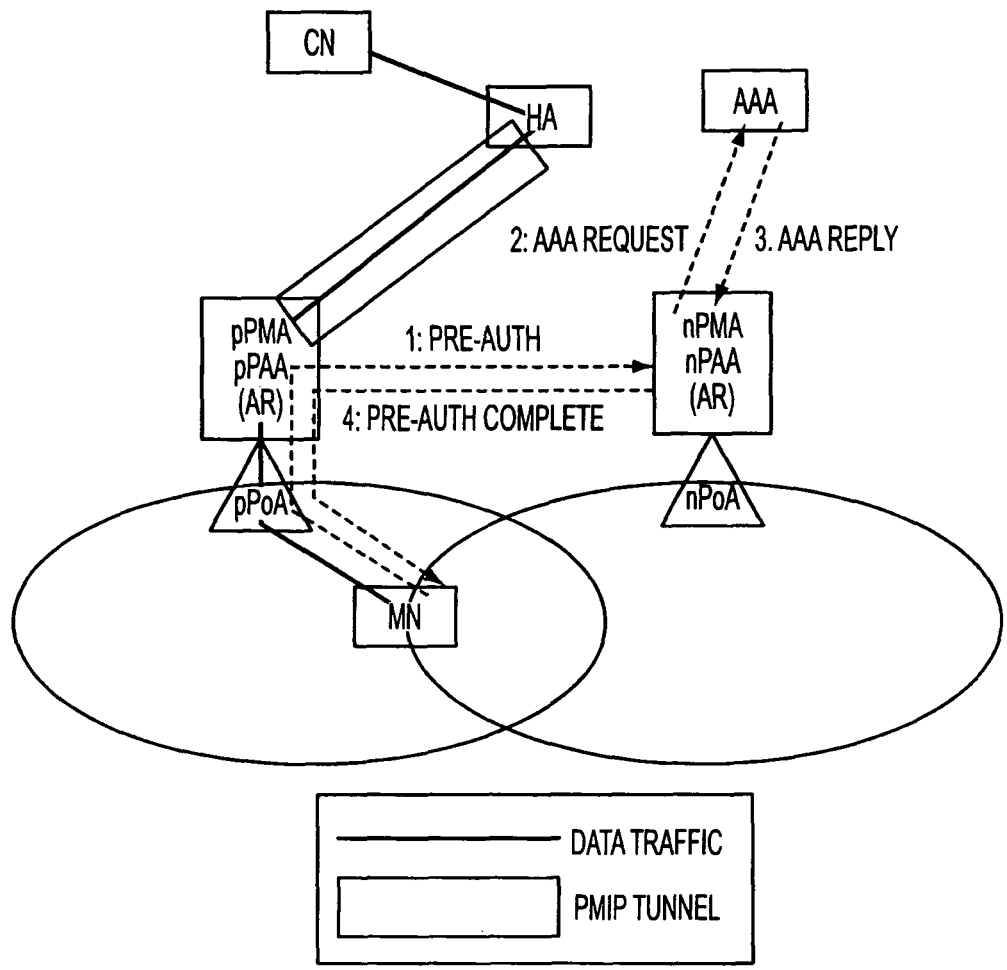
FIG. 3(*a*) is a diagram showing a direct pre-authentication phase according to some illustrative examples.

Option 1: Direct Pre-authentication: FIG. 3a shows the direct pre-authentication phase. This pre-authentication is layer 3 pre-authentication. Although a layer 3 pre-authentication can also start the layer 2 pre-authentication. Through some discovery process such as IEEE 802.21-based information service (see, e.g., reference [802.21] above), the mobile discovers the details of the network elements in the next access network. In particular it obtains the relevant information such as MAC address, IP address of the access router. Since nPMA and nPAA do co-exist with the NAR, the mobile also obtains the address of PMA and PAA as well. As the mobile starts the pre-authentication process with nPAA, nPMA would finish checking the mobile's profile and obtains mobile's home prefix ahead of time from the HA. nPMA obtains MN's profile and understands pre-auth state. nPMA can optionally communicate with the MA server as a backend server. During the process of pre-authentication the tunnel is also created between the PPMA and nPMA. Both PPMA and nPMA need to know each other's end-points so that they can create the desired tunnel. The pre-auth packet has the PPMA address that is used to create the tunnel between PMAs.

Figure 3B:
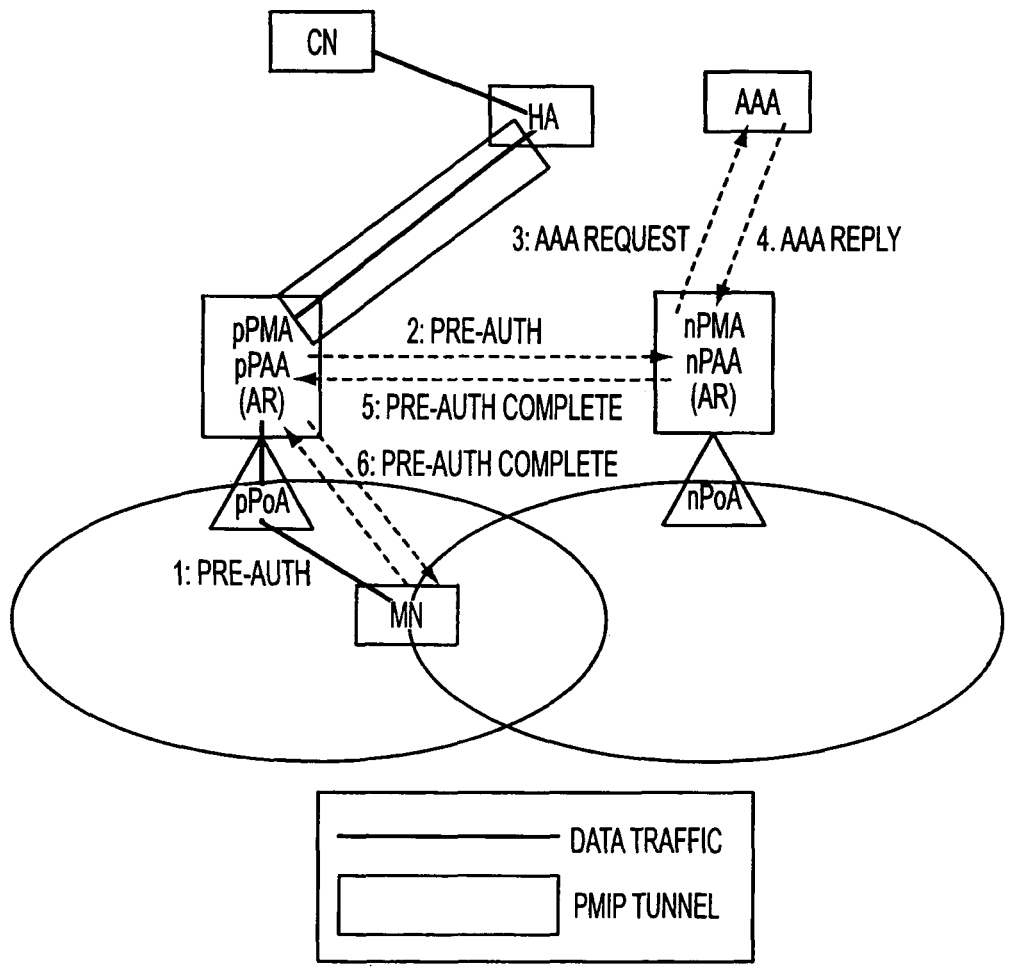

Option 2: Indirect Pre-authentication: FIG. 3b shows the indirect pre-authentication. In case of indirect pre-authentication, PPMA is involved as a pass-through and acts like a pre-authentication proxy. In this case also, nPM is co-located with nPMA. During the pre-authentication phase, nPMA also obtains the mobile's profile and then receives prefix from the HA, that it can use to advertise. Pre-auth signaling can be used to create tunnel.

Here, the data delivery path can be shown as follows:

Data Packet ANY->HoA;

PMIP Tunnel-Outer HA->PPMA, Inner ANY->HoA.

Figure 4A:
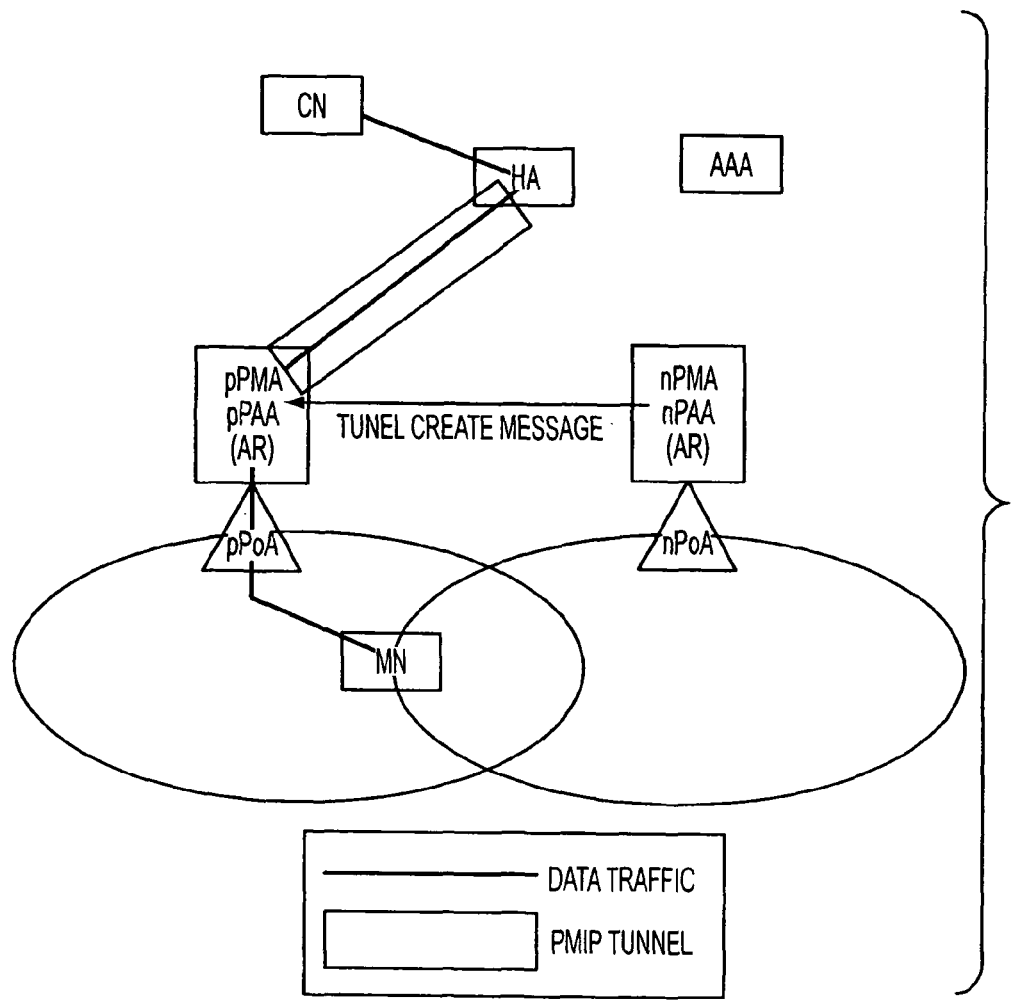
FIGS. 4(*a*) and 4(*b*) show the detailed procedure of how the proactive transient tunnel between PPMA and nPMA is created according to some illustrative examples.
Figure 4B:
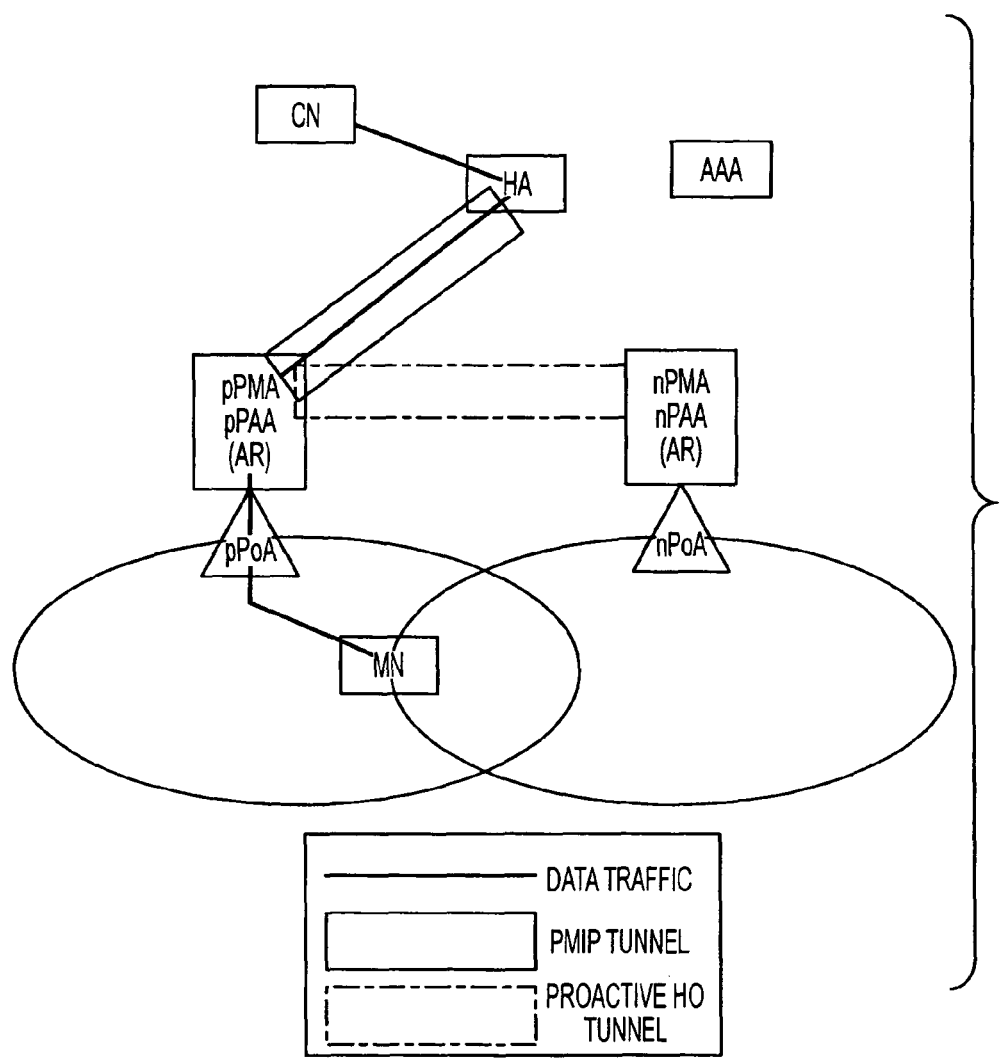

Details of Proactive Tunnel Creation Between pPMA and nPMA:

For reference, FIGS. 4(a) and 4(b) show tunnel create messaging. In particular, FIGS. 4 (a) and 4(b) show the detailed procedure of how the proactive transient tunnel between PPMA and nPMA is created. During the pre-authentication phase, the PPMA and nPMA come to know each other's IP address and thus can set up the tunnel.

Here, the details of proactive handover tunnel include:

Proactive HO Tunnel: Outer nPMA->PPMA, Inner ANY->HoA.

Figure 5:
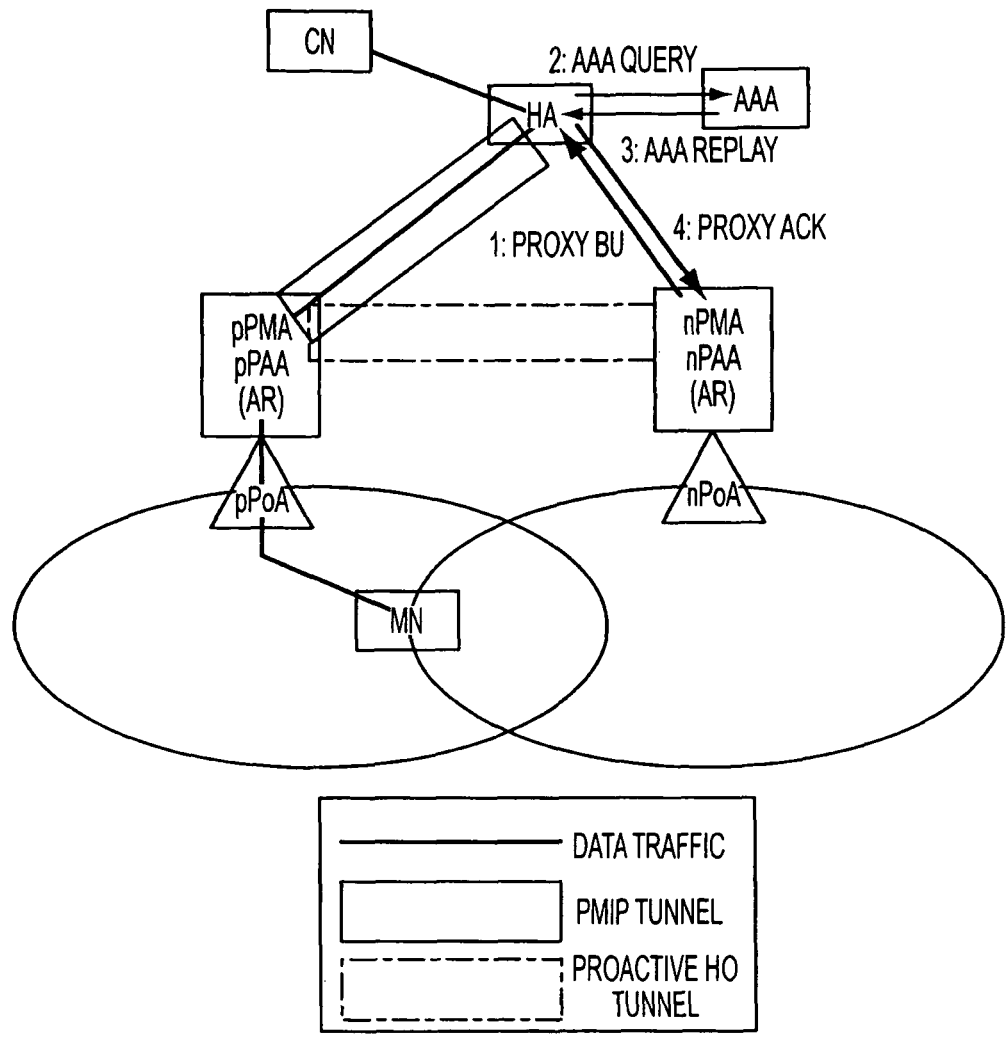
FIG. 5 shows the mechanism associated with the proxy binding update, where the nPMA updates the HA with the source address of nPMA and gets the home prefix that it can send in the router advertisement, according to some illustrative examples.

Proxy Binding Update:

After the tunnel is created between the PPMA and nPMA during the authentication phase, nPMA sends a proxy binding update on behalf of the mobile. FIG. 5 shows the mechanism associated with the proxy binding update, where the nPMA updates the HA with the source address of nPMA and gets the home prefix that it can send in the router advertisement. During the proxy binding update the data still flows through the PPMA.

Figure 6:
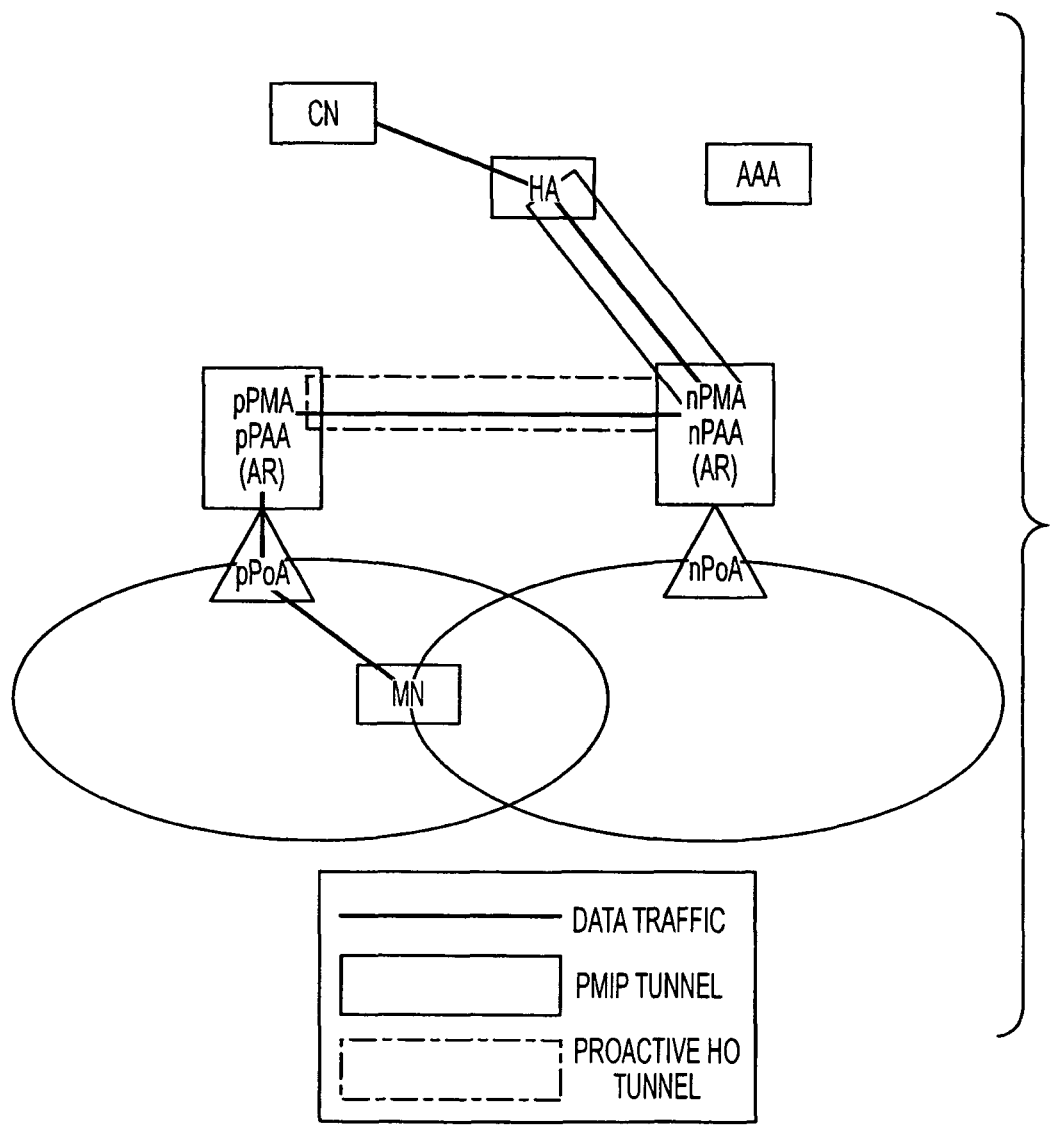
FIG. 6 is a diagram showing tunnel creation between a HA and an nPMA according to some illustrative examples.

Here, the data delivery path can be shown as follows:
Data Packet: ANY->HoA;
Proactive HO Tunnel: Outer nPMA->PPMA, Inner ANY->HoA Tunnel Creation Between nPMA and HA:

After the proxy-binding update is sent to the HA from nPMA on behalf of the mobile, another tunnel is created between HA and PPMA. FIG. 6 shows this procedure. However while this tunnel is being created, the data still flows through PPMA. Thus data loss is avoided during this tunnel creation. However, after the tunnel is created the new data gets forwarded to pPoA via two tunnels that were created between HA and nPMA and nPMA and PPMA.

Here, the data delivery can be shown as follows:
Data Packet: ANY->HoA;
PMIP Tunnel: Outer HA->nPMA, Inner ANY->HoA;
Proactive HO Tunnel: Outer nPMA->PPMA, Inner ANY->HoA.

Figure 7:
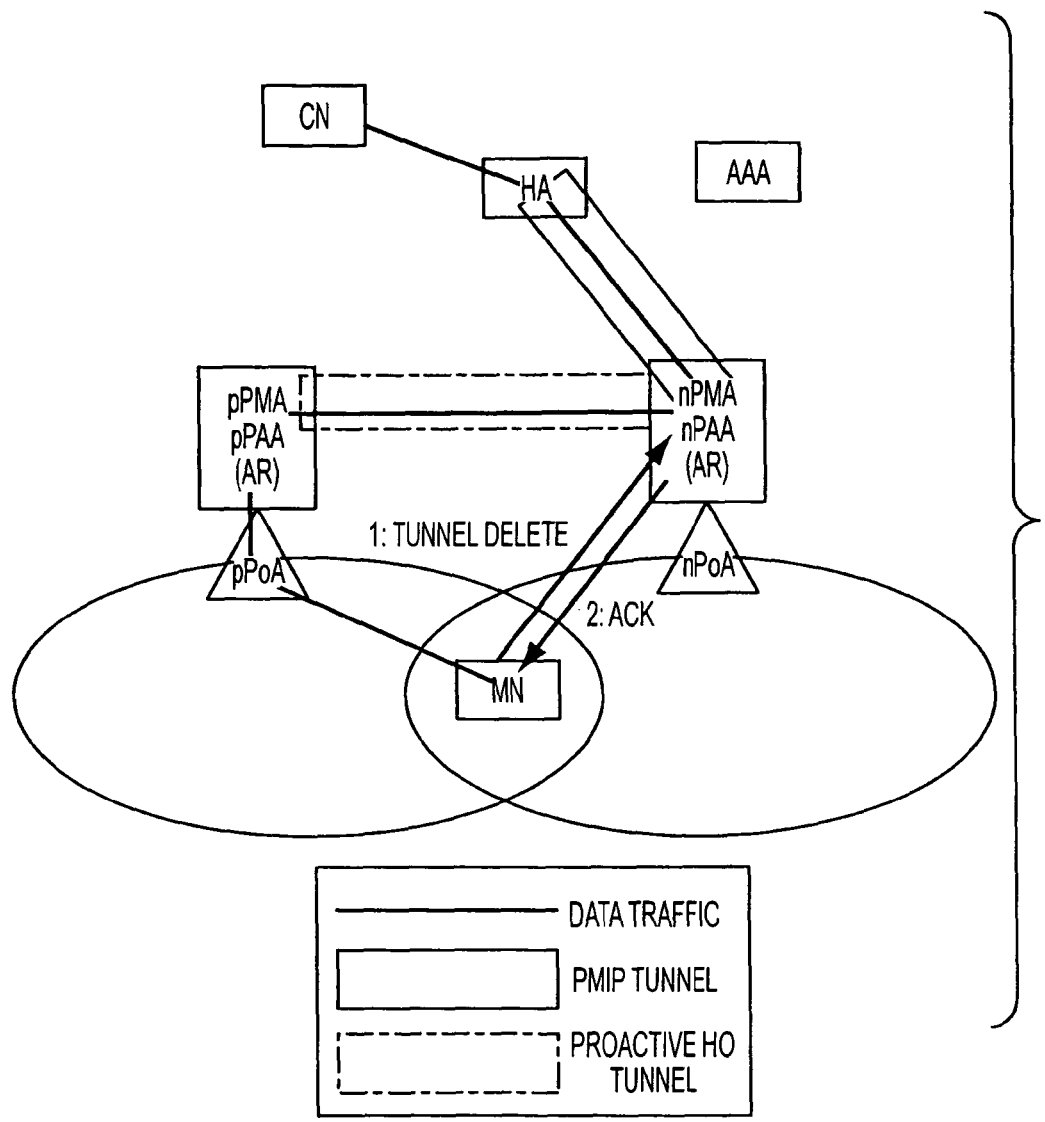
FIG. 7 is a diagram showing tunnel deletion procedure according to some illustrative examples.

Proactive Tunnel Deletion Before the Move:

Since the tunnel between PPMA and nPMA should not be there when the mobile is nPoA, this tunnel should be deleted by the mobile just before it moves to the nPoA. FIG. 7 shows, how the tunnel is deleted just before the mobile moves to the new PoA. In some cases, it is advisable to keep the tunnel on to avoid the ping-pong effect. The trajectory of data looks as follows.

Here, the data delivery path can be shown as follows:
Data Packet: ANY->HoA;
PMIP Tunnel: Outer (HA->nPMA), Inner (ANY->HoA);
Proactive HO Tunnel: Outer (nPMA->PPMA), Inner (ANY->HoA).

MN Moves to Npoa (Movement to the New Network):

At a certain threshold the mobile finally ends up moving to the nPoA. Based on the RA from the NAR, the mobile realizes that it is in a new network, and changes its default router. But, since pre-authentication and binding update have already been taken care of ahead of time, the mobile does not need to go through the process of access authentication (layer 2 and layer 3) again. This will reduce the effective handoff time and eventually the packet loss as well. Once the HA detects that the mobile is already within nPMA, it can always delete the tunnel between PPMA and HA.

Here, the data delivery path can be shown as follows:
Data Packet, (ANY->HoA);
PMIP Tunnel, Outer (HA->nPMA), Inner (ANY->HoA).

II. Inter-Domain Movement (Inter-Domain Handoff):

In this section we define inter-domain movement for the mobile, where PPMA and nPMA are in two different domains. Thus there is a different LMA (HA) designed for each of the PMA (MAG). Thus PPMA and nPMA send different home prefix as part of their router advertisement. In this situation when the mobile moves between two PMAs, it will try to configure itself with a new HoA. There can be two cases how this can be handled. In one situation, the MN is equipped with CMIP and in another case MN is not equipped with CMIP. When the MN is not equipped with CMIP, the nPMA sends the bind update on behalf of the MN, but there is no tunnel between nPMA and pHA in this case.

Figure 8:
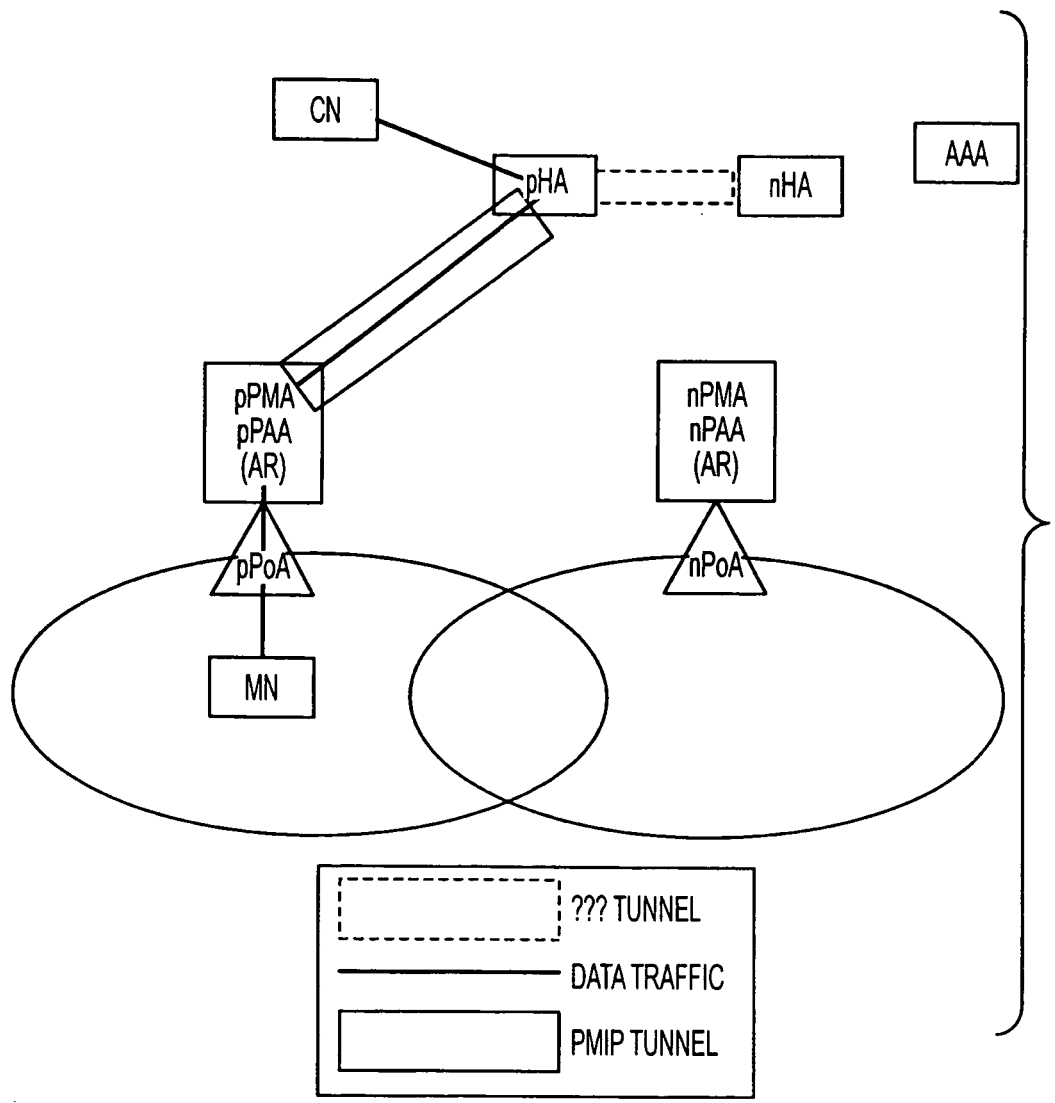
FIG. 8 is a diagram showing initial bootstrapping state according to some illustrative examples.

Initial State (Bootstrapping State):

The initial state for inter-domain case would be same as the initial state for intra-domain case. The tunnel between pHA and nHA could be made ahead of time. As shown in the diagram, PPMA is under pHA and nPMA is under nHA. Tunnel between pHA and nHA could be done ahead of time or on-demand basis. In order to be able to create the tunnel it is assumed that there is a service agreement between two network providers. For reference, FIG. 8 shows the state of initial bootstrapping.

Here, the data delivery path can be shown as follows:
Data Packet: ANY->pHoA;
PMIP Tunnel: Outer HA->nPMA, Inner ANY->pHoA.

Figure 9:
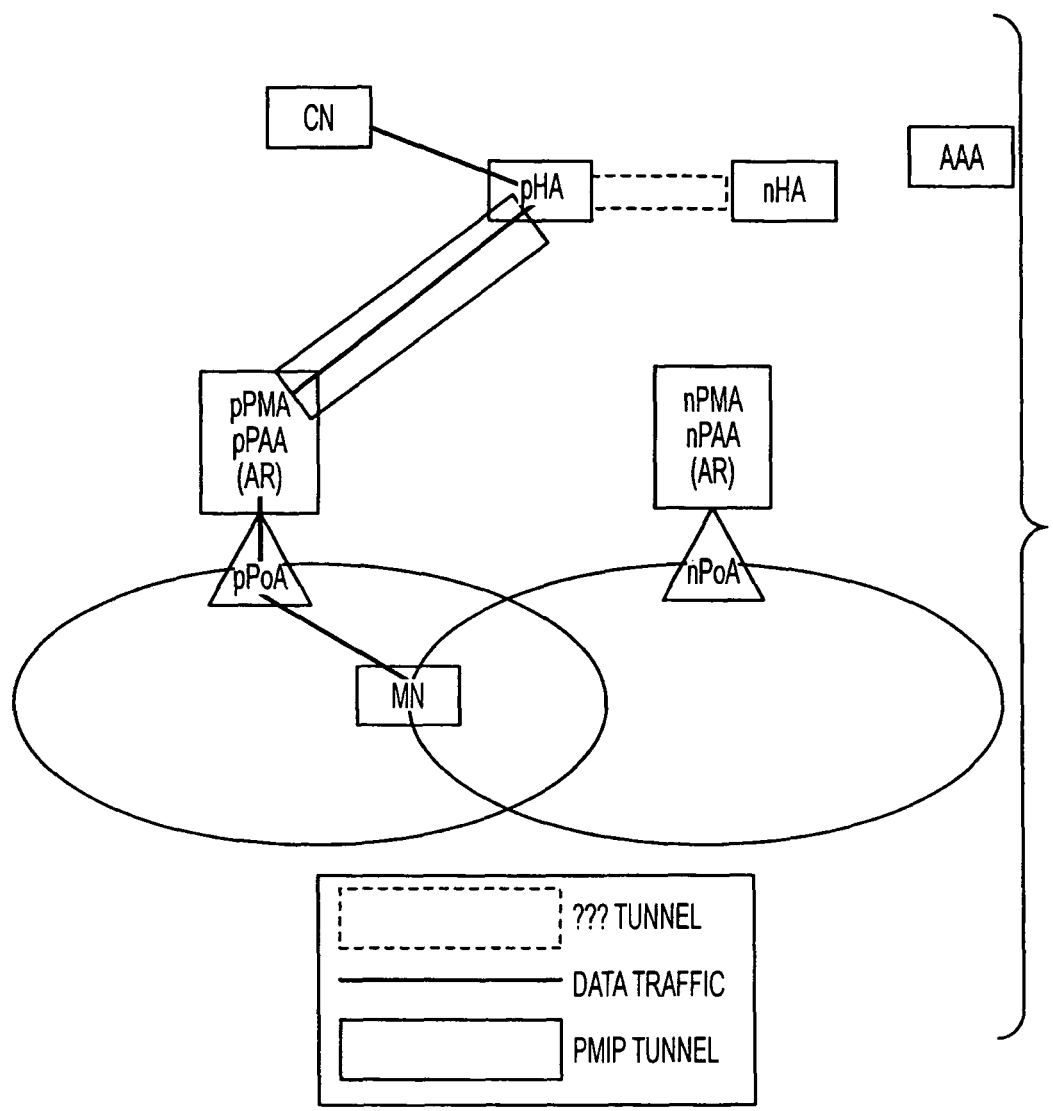
FIG. 9 is a diagram depicting a mobile node moving away from the pPoA according to some illustrative examples.

MN Detects that it is Leaving the Network (MN is Impending to Move):

FIG. 9 shows the case when the mobile is about to leave the network based on certain threshold. But the data still flows through pHA at this point.

When the mobile is about to leave the network based on certain threshold, it begins the pre-authentication phase. But the data still flows through pHA at this point.

Here, the data path can be shown as follows:
Data Packet: ANY->pHoA;
PMIP Tunnel: Outer HA->nPMA, Inner ANY->pHoA.

Pre-Authentication State (Pre-Authentication Phase):

In this state, MN starts the pre-authentication stage. Just like in intra-domain case, there are two types of authentication possible, direct authentication and indirect authentication. This authentication is layer 3 authentication, although a layer 3 authentication can bootstrap the layer 2 authentication also. PAA is collocated with PMA in each domain. Here, the path of data flow in this state is as follows:
Data Packet, ANY->pHoA;
PMIP Tunnel, Outer (HA->nPMA), Inner (ANY->pHoA);
Data path in the Tunnel between Has: Outer (pHA->nHA), Inner (ANY->pHoA).

As part of the pre-authentication, nPMA obtains MN's profile and understands that it is pre-auth state, and obtains the prefix meant for the new network.

Figure 10:
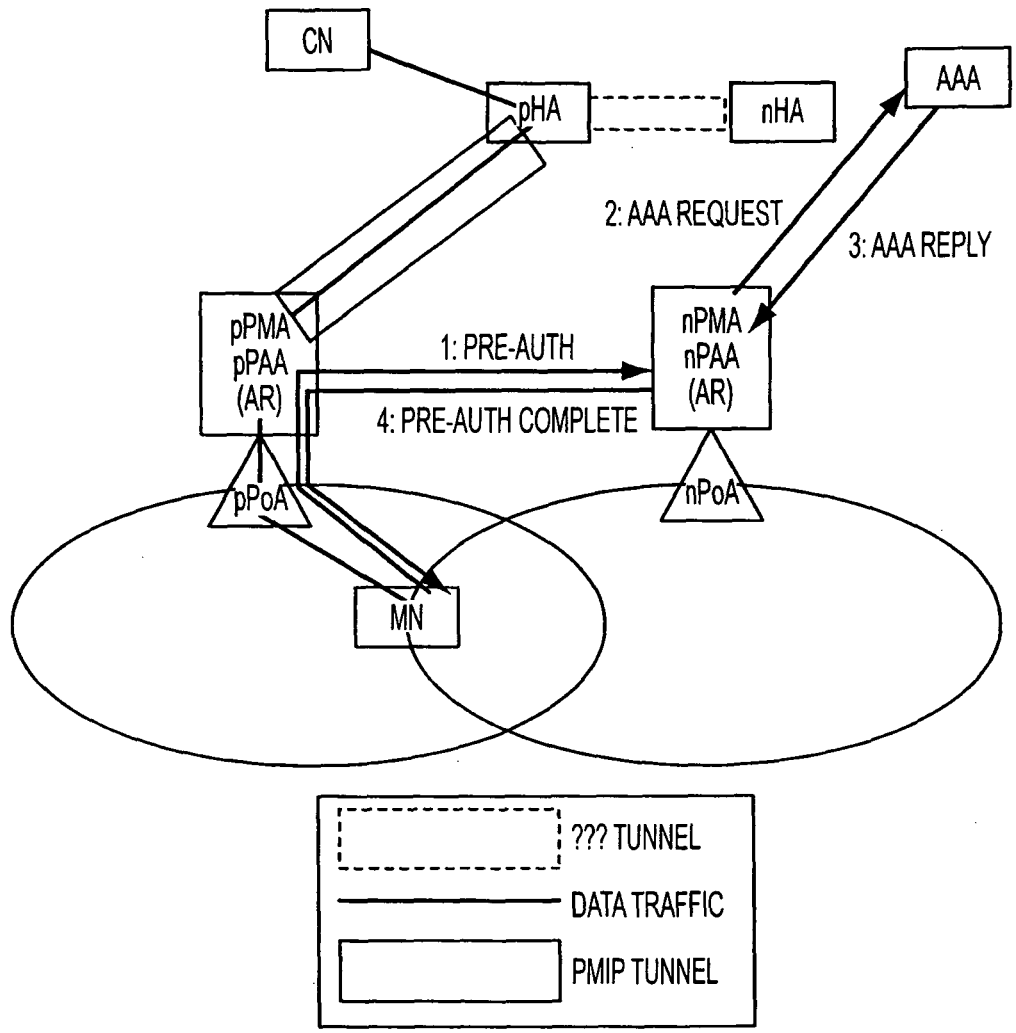
FIG. 10 is a diagram showing direct pre-authentication according to some illustrative examples.

Direct Pre-Authentication:

FIG. 10 shows the call flows with direct pre-authentication.

This section describes the direct pre-authentication for Inter-domain case. Direct pre-authentication for Inter-domain case is very similar to intra-domain case, where the PPMA acts like a pass through.

Figure 11:
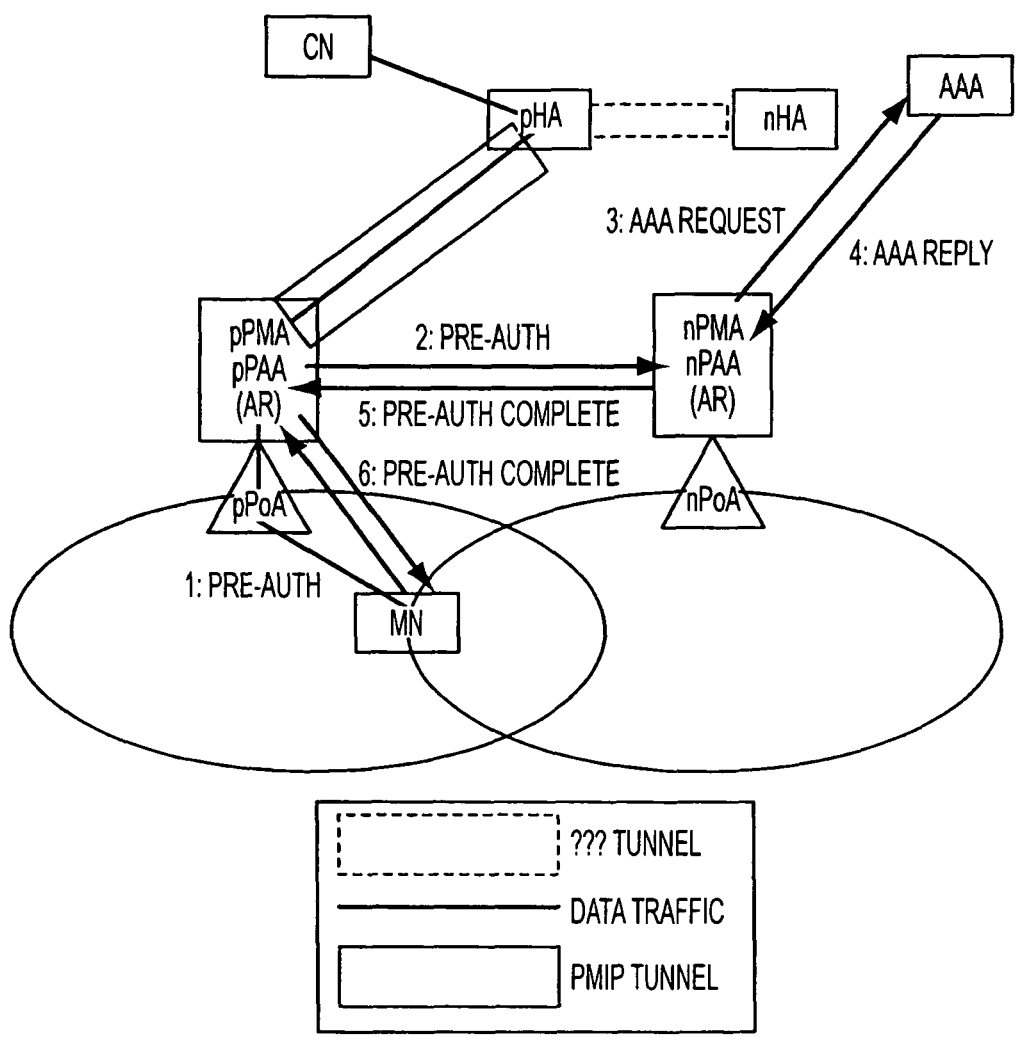
FIG. 11 is a diagram showing indirect pre-authentication according to some illustrative examples.

Indirect Pre-Authentication:

FIG. 11 shows the indirect pre-authentication.

This section describes indirect authentication for inter-domain case. Indirect authentication for inter-domain case is very similar to indirect pre-authentication for intra-domain case. In this case PPMA is involved in the authentication process.

Tunnel Creation Between pPMA and nPMA (Proactive Tunnel Creation):

This section describes the tunnel creation between PPMA and nPMA. In this scenario, nPMA creates a tunnel with PPMA as part of the pre-authentication. Data flow from CN->MN still remains same.

Figure 12A:
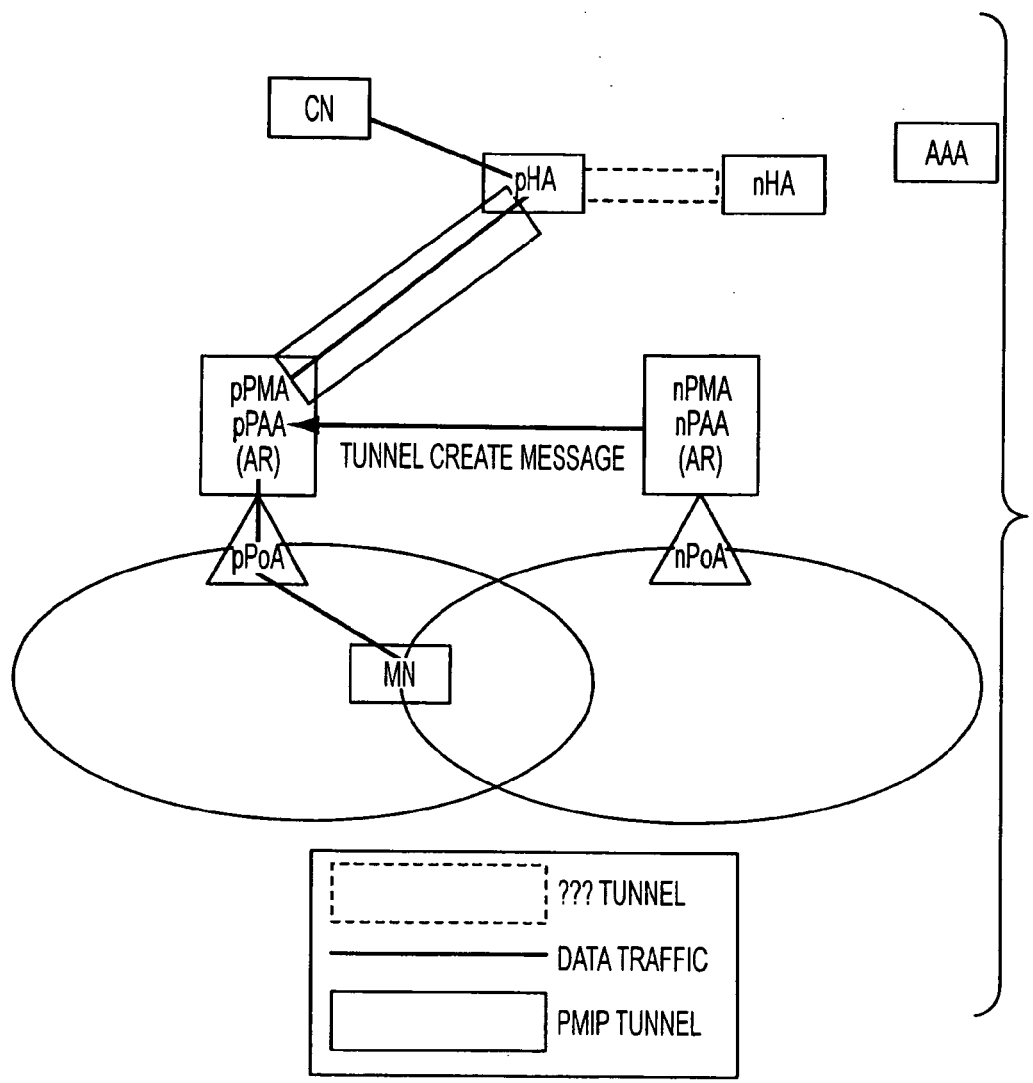
FIG. 12(a) is a diagram showing tunnel creation one side according to some illustrative examples.
Figure 12B:
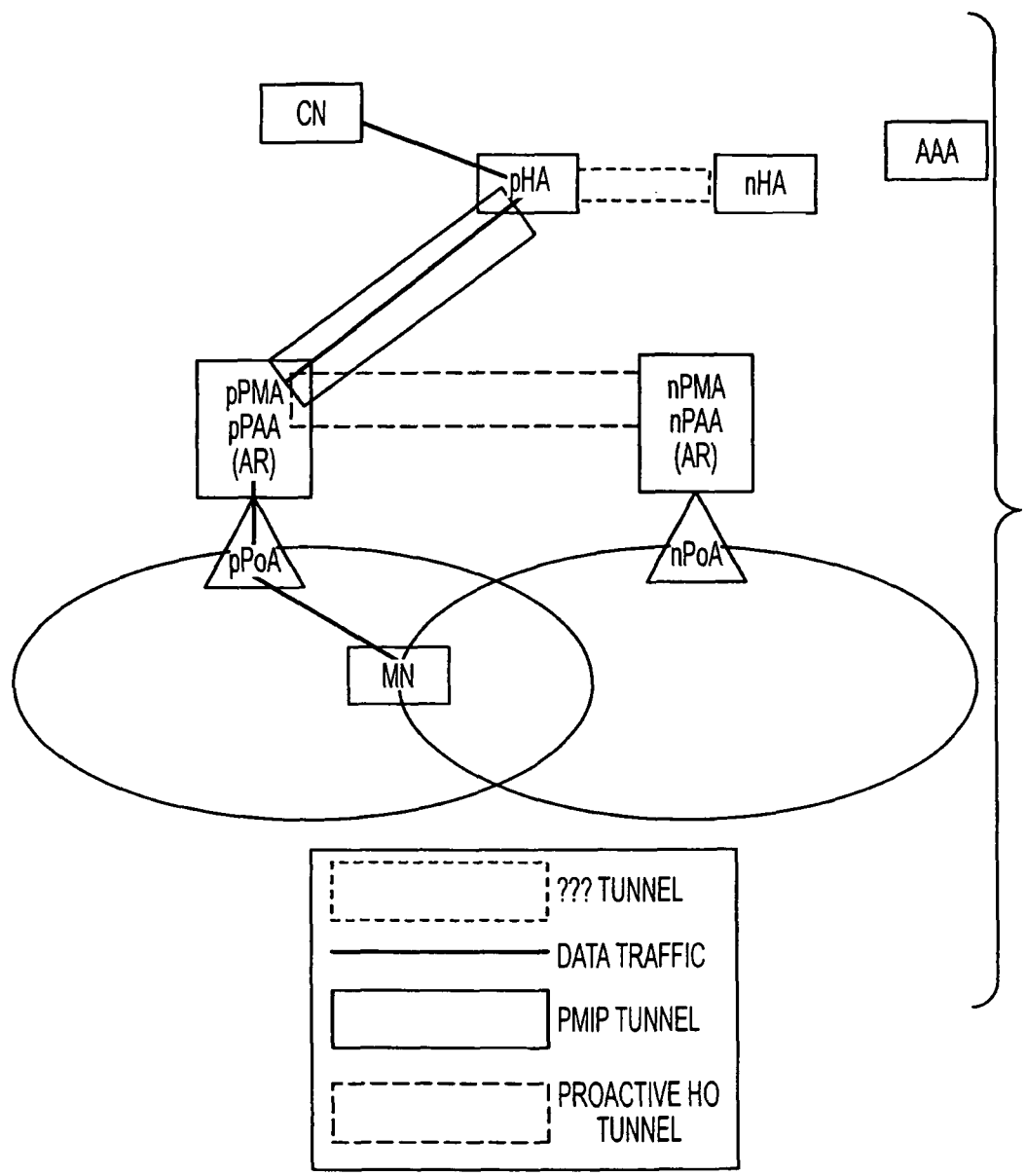
FIG. 12(b) is a diagram showing tunnel creation both sides according to some illustrative examples.

For reference, FIG. 12 shows tunnel creation between nPMA and PPMA, with FIG. 12(a) showing tunnel creation one side, and FIG. 12(b) showing tunnel creation both sides.

Here, the data delivery path can be shown as follows:
Data Packet: ANY->pHoA;
PMIP Tunnel: Outer pHA->PPMA, Inner ANY->pHoA.

Proxy Binding Update (Proactive Proxy Binding Update):

Proxy-binding update takes place when the mobile is still in the previous network. FIG. 13 shows the proxy-binding update stage (e.g., proxy binding update to both pHA and nHA). nPMA sends the Proxy Binding Update to nHA and nHA sends Proxy Binding Ack. nPMA sends its address to the nHA as part of the proxy binding update (nHoA:nPMA). nPMA also sends a binding update to pHA with an address of nHA binding to pHoA (pHoA:nHoA). As part of this phase, a tunnel is created between nHA and nPMA. Any traffic destined to pHoA will be first intercepted by the pHA, will be forwarded to nHA and will eventually reach the nPMA using the nHA-nPMA tunnel. In case of PMA, this traffic will be tunneled back to the mobile using pPMA-nPMA tunnel.

Figure 13A:
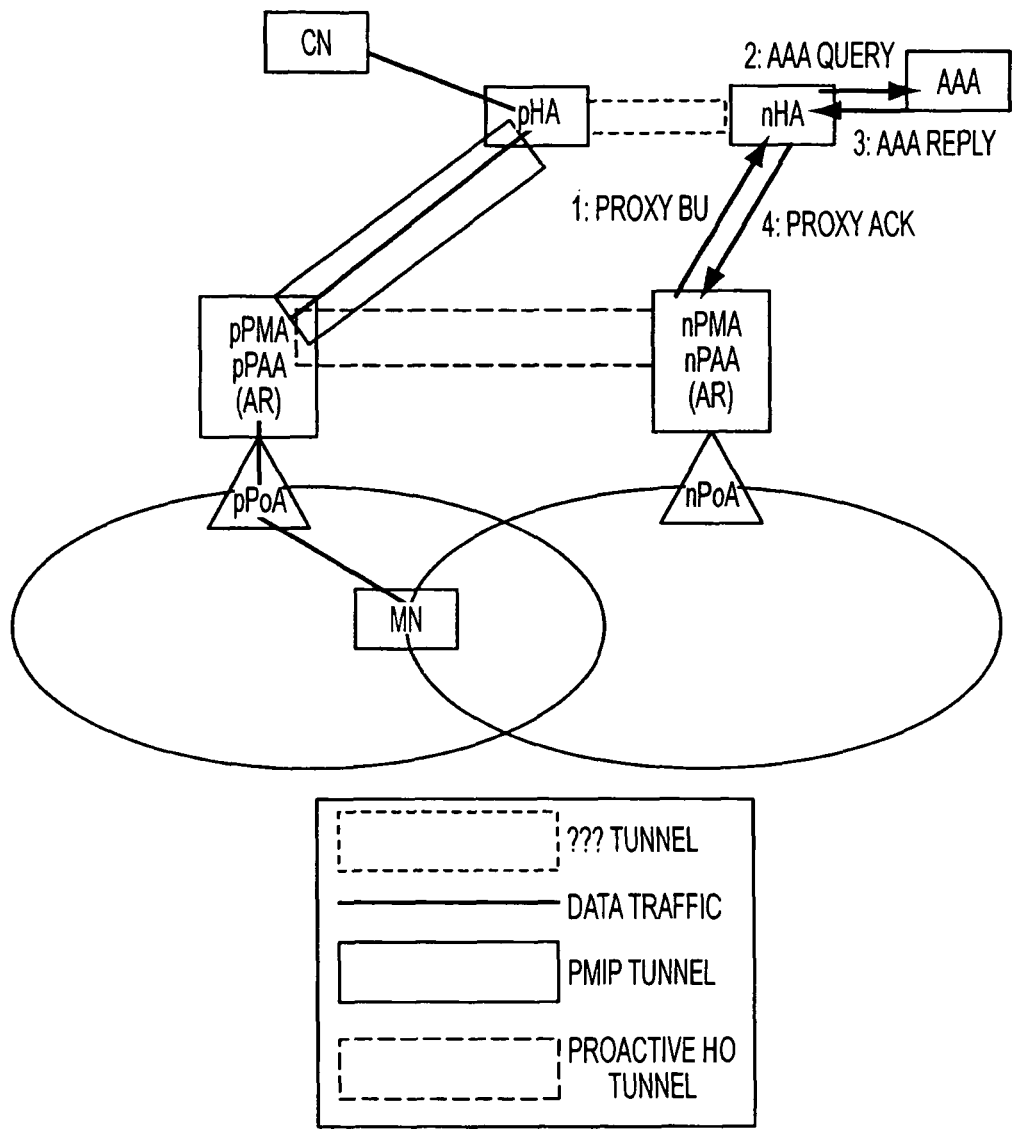
FIG. 13(a) is a diagram showing proxy binding update to the nHA according to some illustrative examples.
Figure 13B:
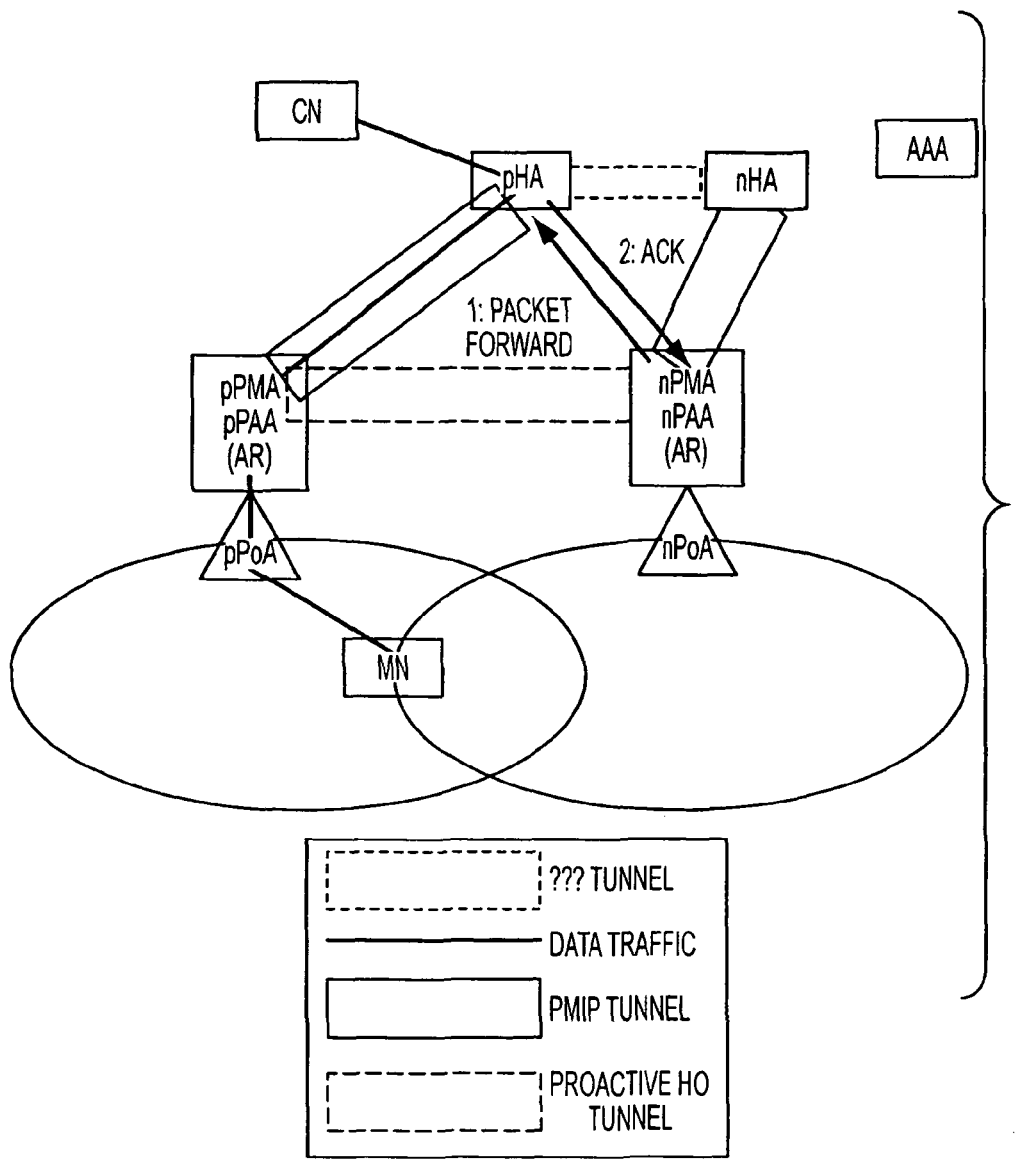
FIG. 13(b) is a diagram showing proxy binding update to the pHA according to some illustrative examples.

As indicated, FIGS. 13(a) and 13(b) show Proxy Binding Update to both pHA and nHA.

In particular, FIG. 13(a) shows the proxy binding update to nHA and FIG. 13(b) shows the proxy binding update to pHA. These could take place at the same time or in sequence. As soon as the proxy binding update to nHA is complete, a tunnel is setup between nPMA and nHA. Proxy-binding update to pHA sets up the forwarding table at pHA to nHA. We assume that there is some sort of security association between nPMA and pHA so that nPMA can update pHA.

Figure 14:
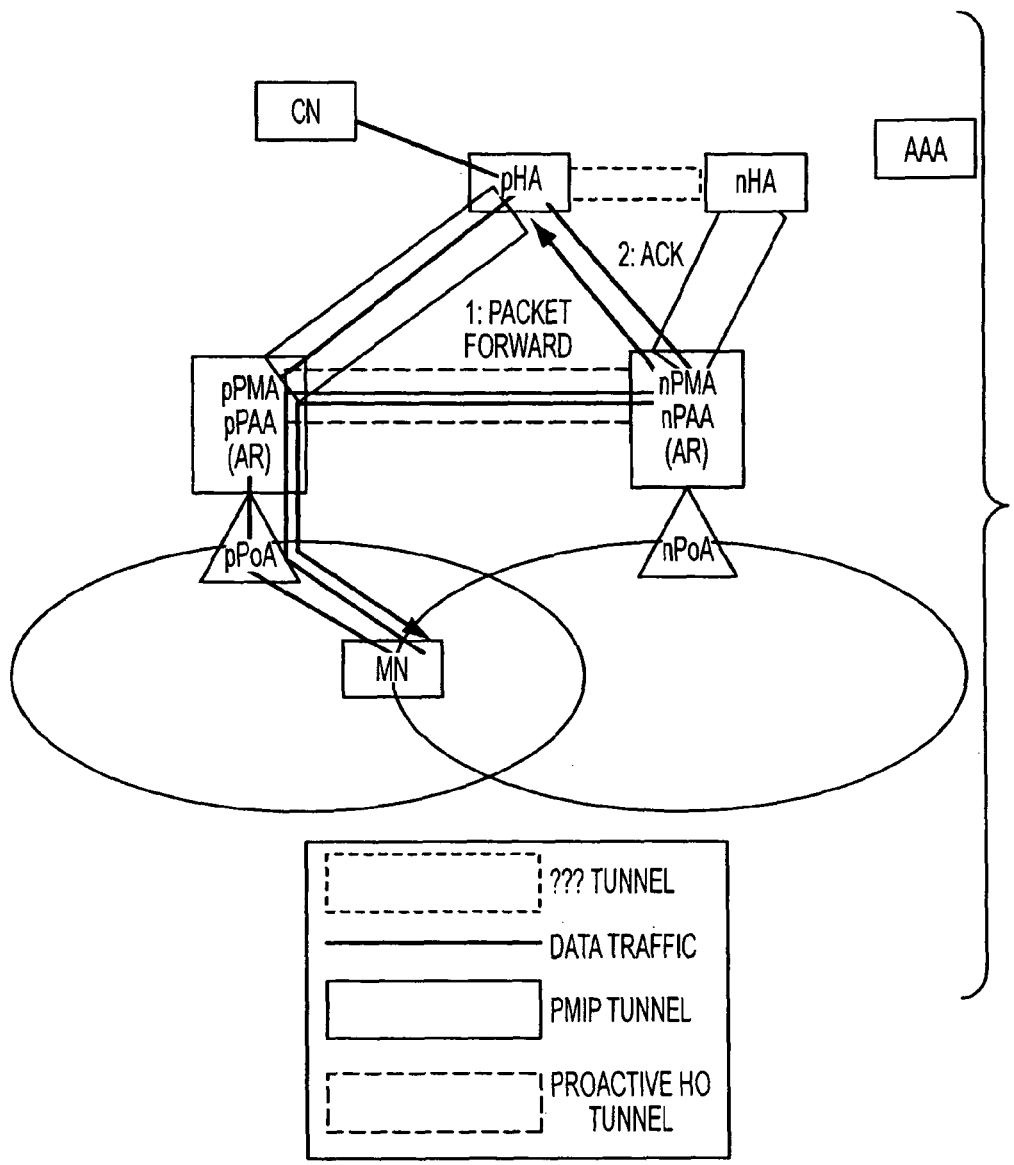
FIG. 14 is a diagram showing a mobile node sending a binding update to a pHA about nHoA according to some illustrative examples.
Figure 15:
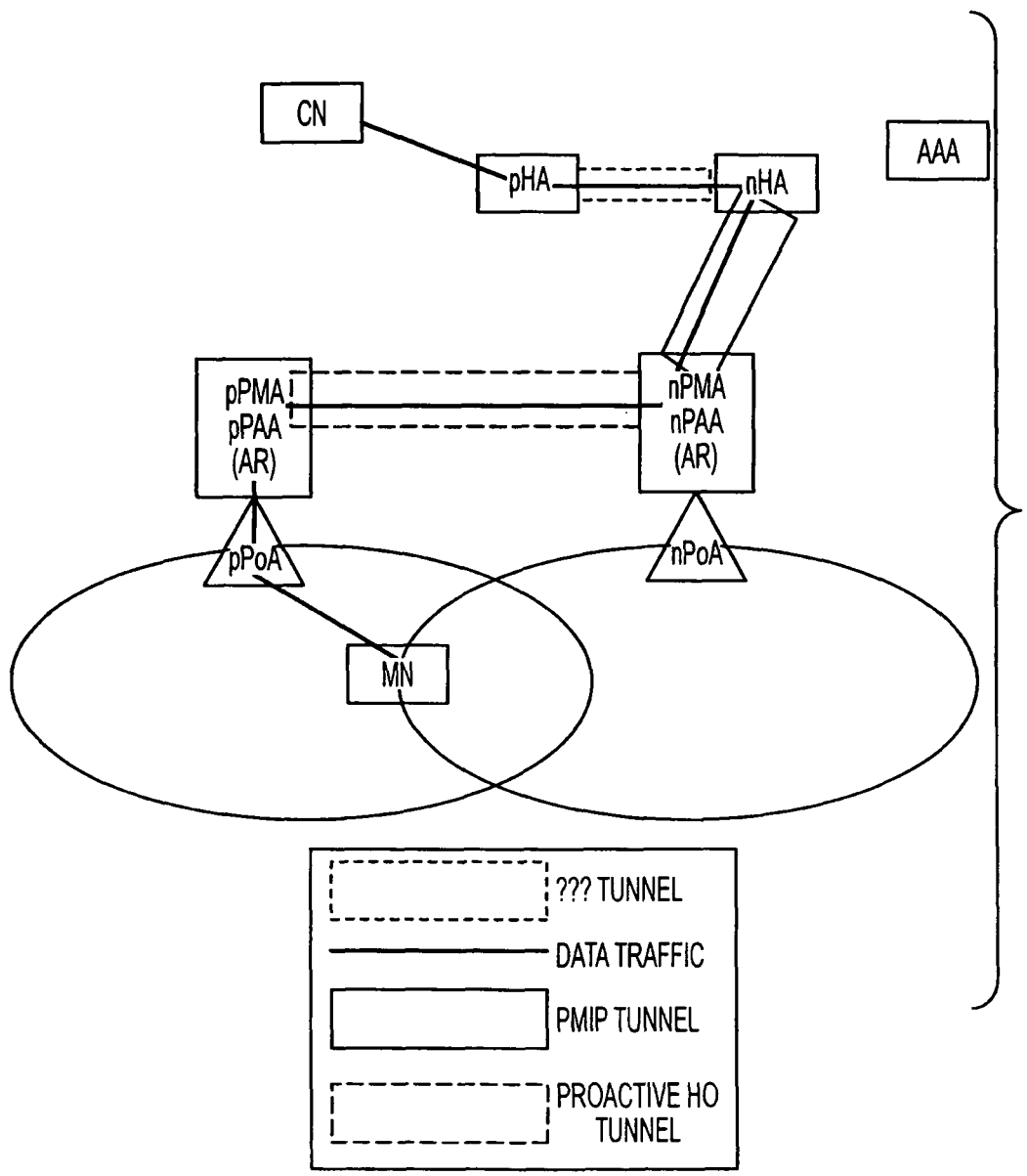
FIG. 15 is a diagram showing a data flow from the correspondent node to the mobile node using tunnels according to some illustrative examples.

Alternatively, the mobile can send the update signal to the pHA directly about nHoA, as it already has the prefix of the new HA. FIG. 14 shows such a scenario in which the MN sends a binding update to pHA about nHoA. But in this case the mobile needs to be equipped with client MIPv6. It is assumed that the client maybe equipped with cMIPv6 in order to help the inter-domain roaming. In case of CMIP, the mobile can send the binding update either via PPMA or nPMA.

Data Flow when the Mobile is in pPoA:

Once the pHA and nHA are properly updated and the tunnels are setup between nHA, nMPA and between PPMA and nPMA, the data starts flowing from CN to MN in the following way when the mobile is in the previous network. Data instead of being sent over is sent via, nHA and nPMA, thus takes a round about way.

pHA forwards the packet from CN to pHA using a tunnel and pHA now forwards the packet destinated to pHoA to nPMA. The data traffic is forwarded to PPMA using Proactive handover tunnel.

Here, the data path can be shown as follows:

Data Packet: ANY->pHoA;

Tunnel between Has: Outer pHA->nHA, Inner ANY->pHoA;

nPMIP Tunnel:Outer nHA->nPMA, Inner ANY->pHoA, nHoA;

Proactive HO Tunnel: Outer nPMA->PPMA, Inner ANY->pHoA, nHoA

Figure 16:
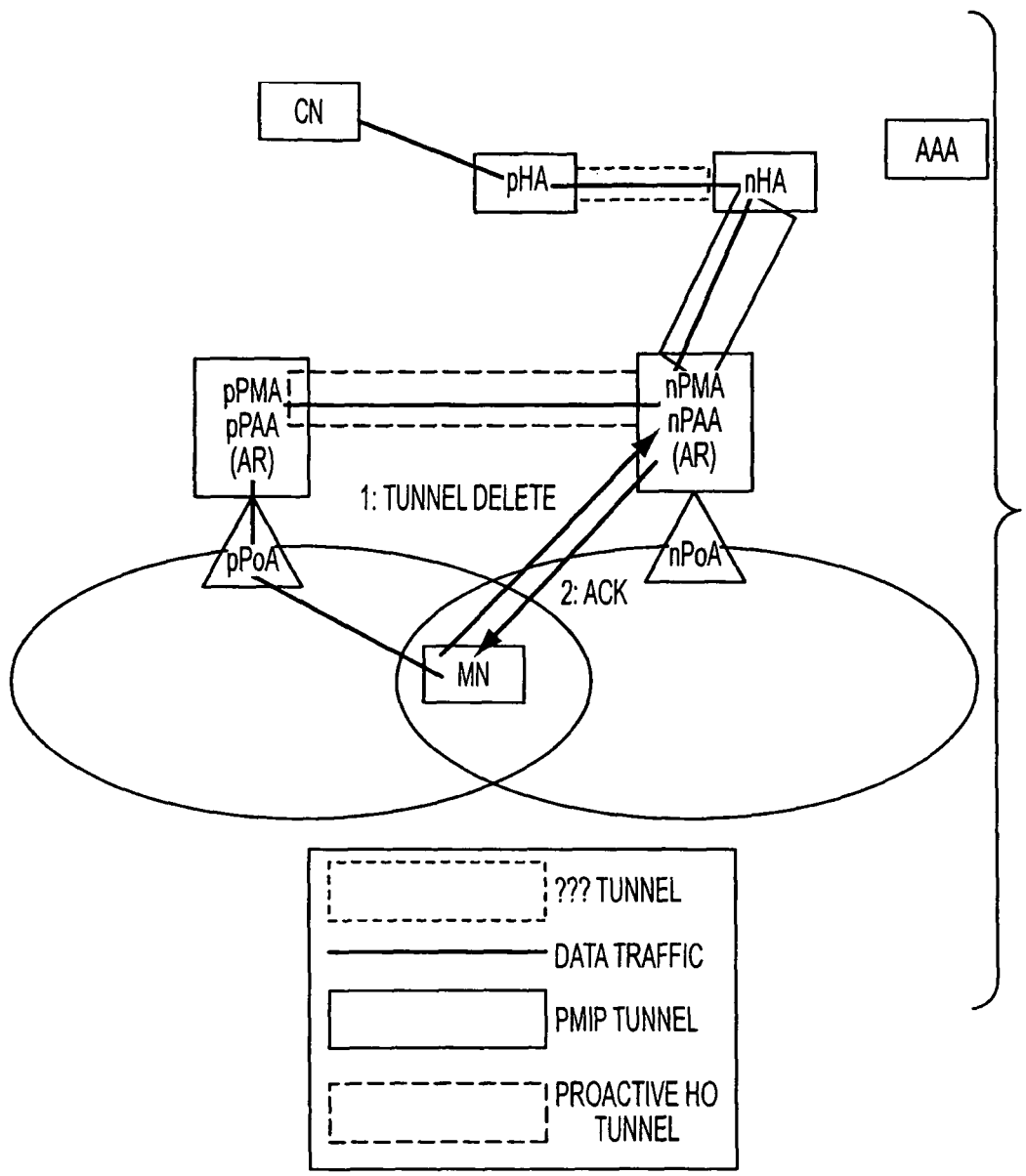
FIG. 16 is a diagram showing tunnel deletion between PPMA and nPMA according to some illustrative examples.

Tunnel Deletion Between pPMA and nPMA:

At certain threshold, the mobile decides to change its layer 2 point of attachment and moves to the new network. Just before it moves, it deletes the tunnel between nPMA and PPMA just like the intra-domain case and lands up in the new network. Any transient traffic during tunnel deletion can still be taken care of by deploying buffering agents at the access routers. FIG. 16 shows the tunnel deletion between the PPMA and nPMA just before the mobile moves to the new PoA.

Here, the data delivery path can be shown as follows:

Data Packet: ANY->pHoA;

Tunnel between HAs: Outer pHA->nHA, Inner ANY->pHoA;

nPMIP Tunnel: Outer nHA->nPMA, Inner ANY->pHoA, nHoA;

Proactive HO Tunnel: Outer nPMA->PPMA, Inner ANY->pHoA, nHoA.

Figure 17:
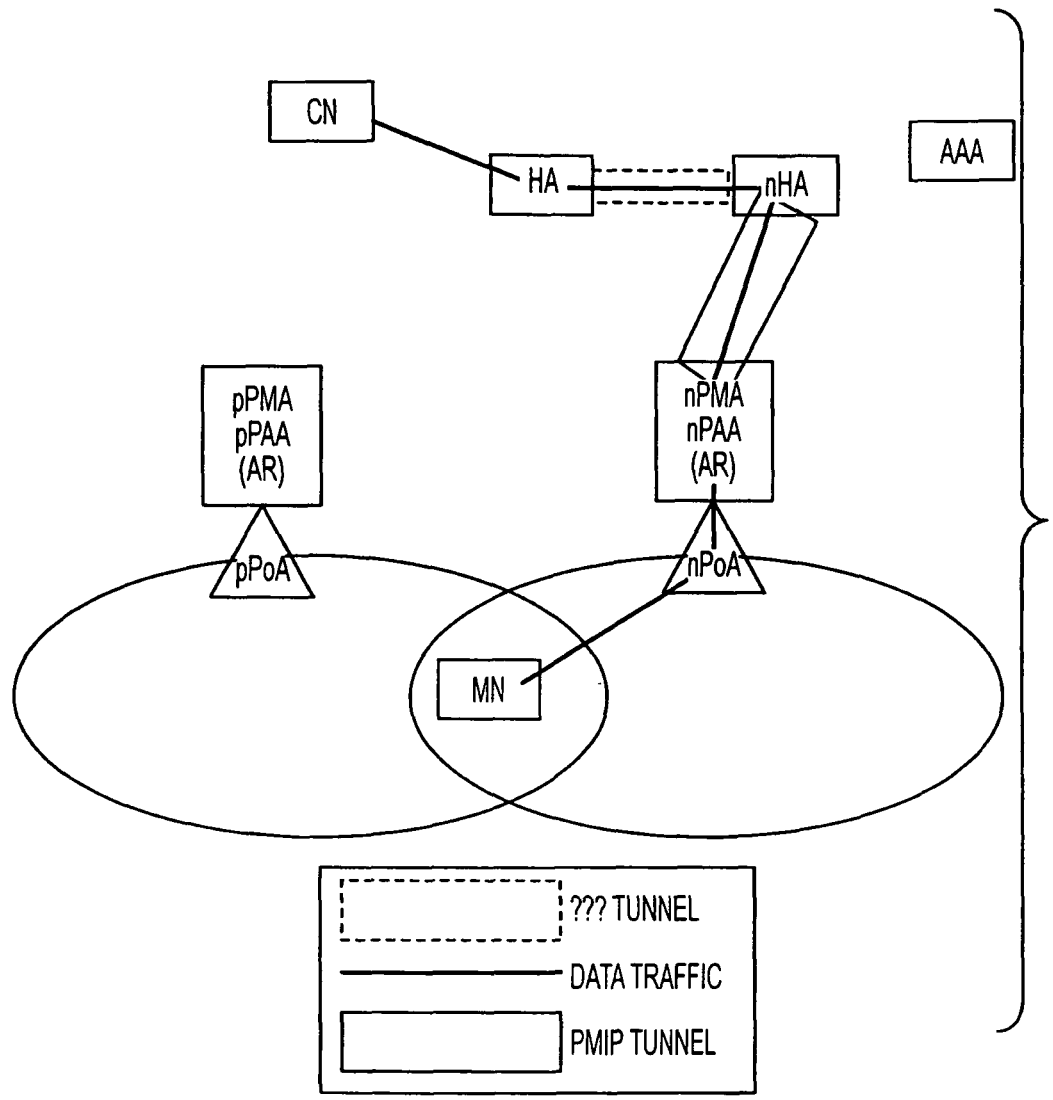
FIG. 17 is a diagram showing data flow in the new domain according to some illustrative examples.
Figure 18:
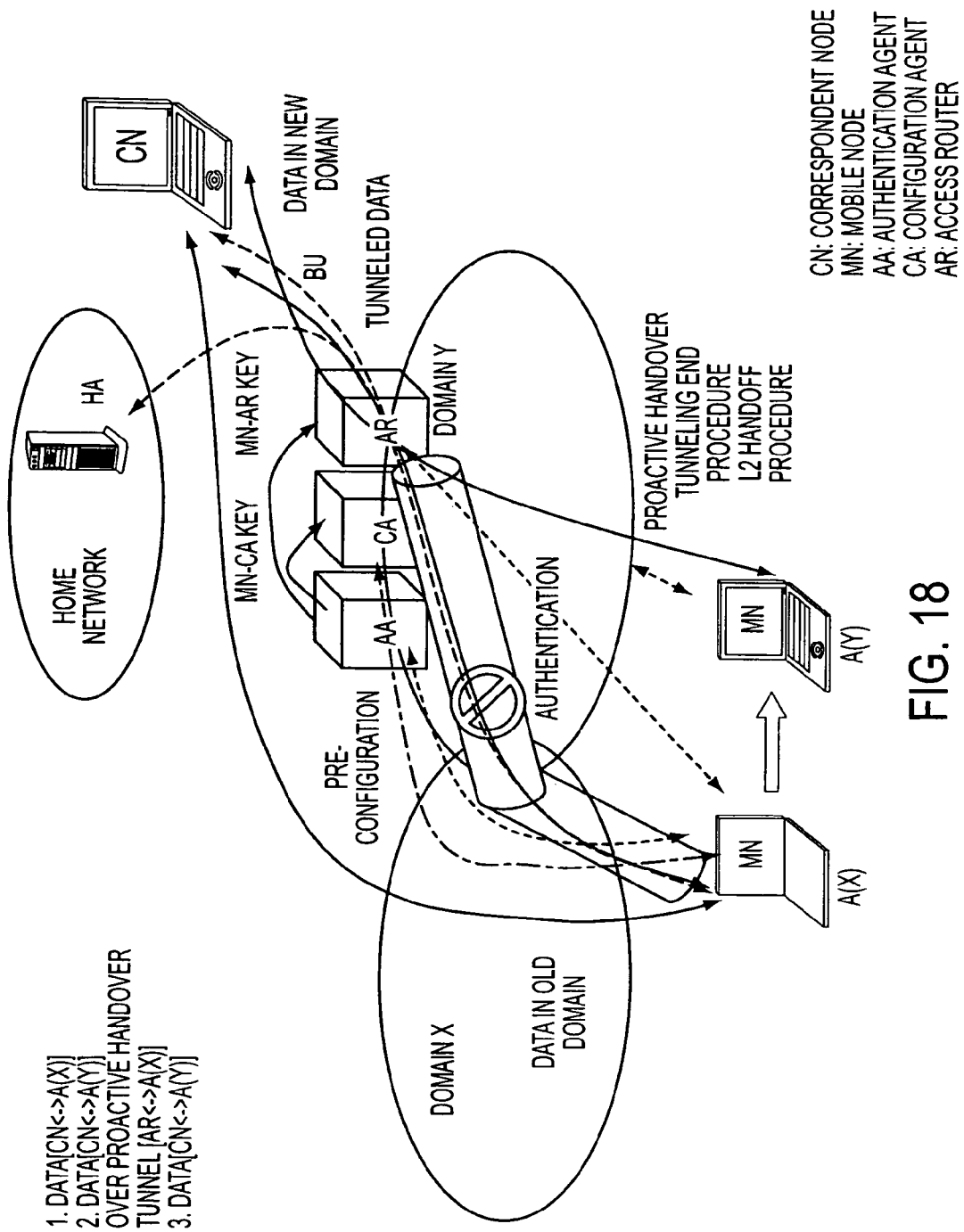
FIG. 18 is a diagram showing an illustrative MPA scenario according to some illustrative examples.
Figure 19:
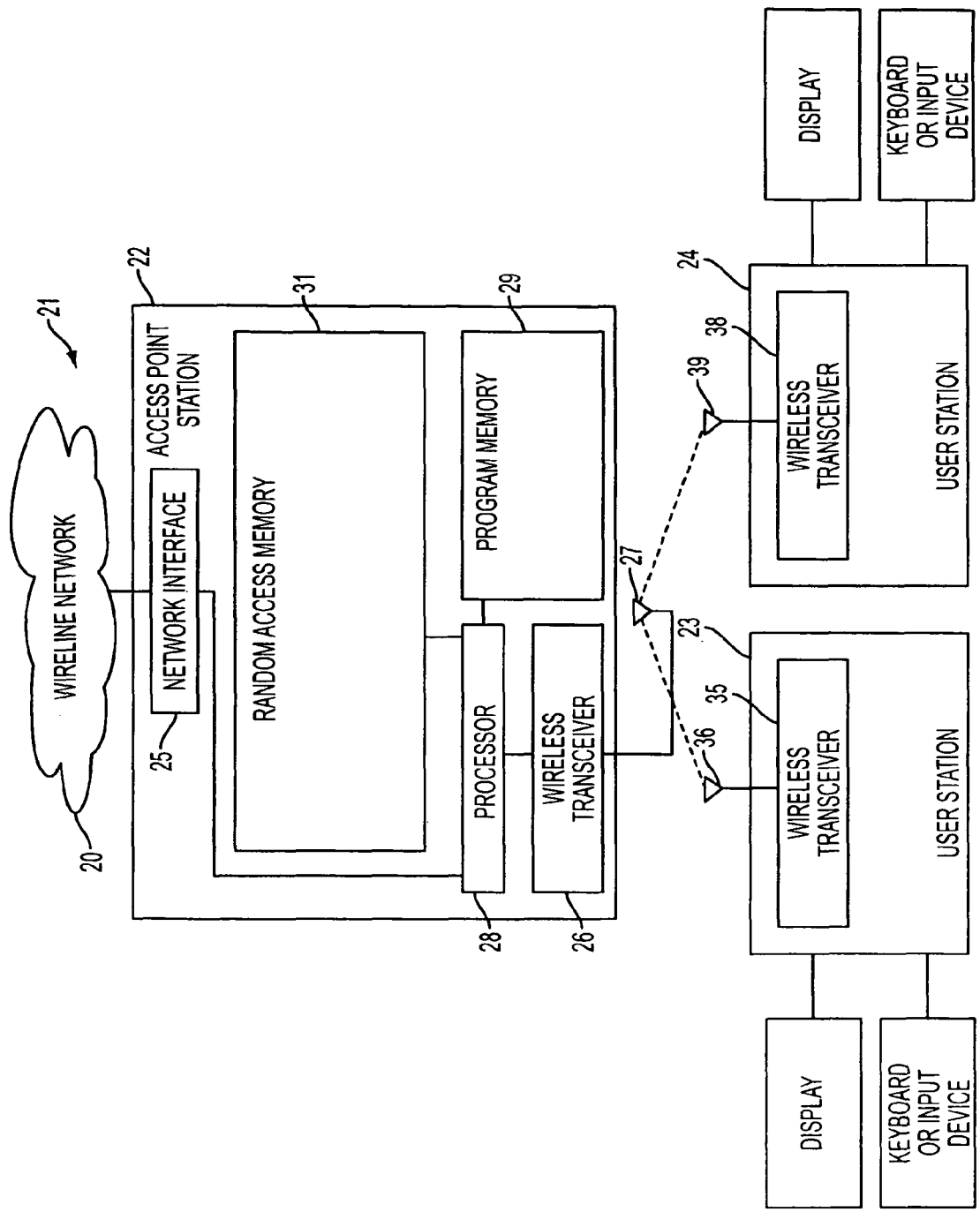
FIGS. 19 and 20 are illustrative architectural diagrams showing components of devices in some illustrative examples.
Figure 20:
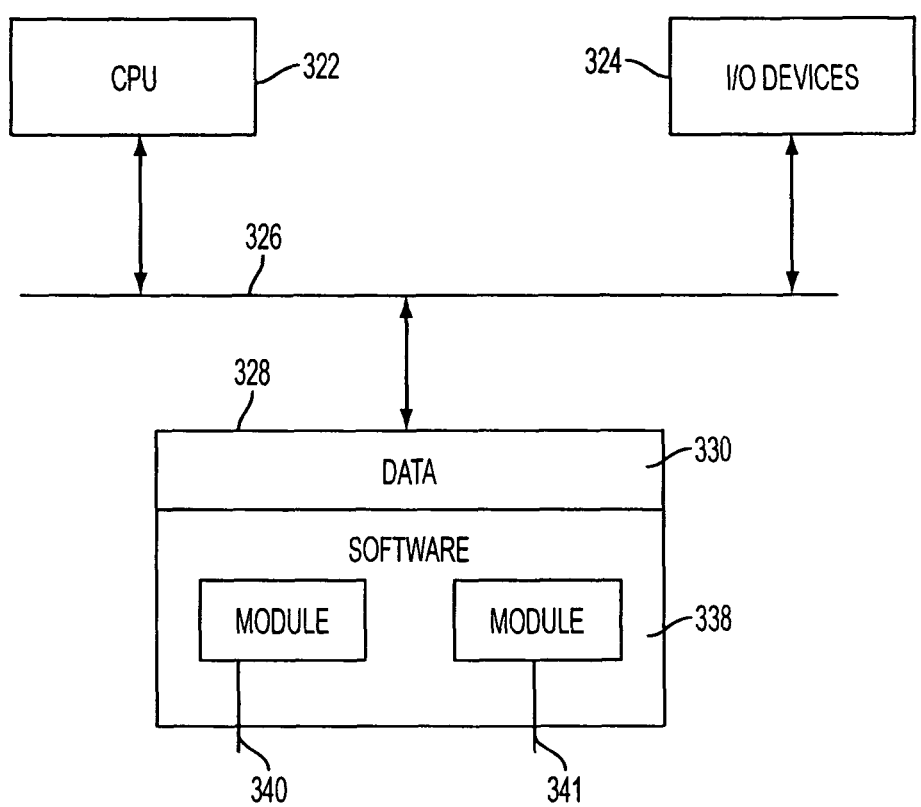

Data Flow in the New Network (Movement to the New Network):

As the mobile moves to the new network, it may not have to go through the DNA process of sending the (Router Solicitation) to learn the MAC address and the default router NAR. Since it already has the MAC address and the IP address of NAR, the mobile can easily start receiving the traffic from nPMA. Since the tunnel is deleted, this traffic will not be forwarded to PPMA. Any transient traffic during tunnel deletion can be buffered at the edge router. FIG. 17 shows the data path after the mobile has moved to the new network.

Here, the data path can be shown as follows:

Data Packet: ANY->pHoA;

Tunnel between HAs: Outer pHA->nHA Inner ANY->pHoA;

nPMIP Tunnel:Outer (nHA->nPMA), (Inner ANY->pHoA, nHoA)

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for optimizing handover in a PMIPv6 environment of a mobile node between access routers having proxy mobile agents (PMA) located within at least one localized mobility management domain having a corresponding localized mobility anchor (LMA/HA), comprising:

employing media-independent pre-authentication (MPA) supporting fast-handoff of a mobile node between a first proxy mobile agent (PMA) of a first access router and a second proxy mobile agent (PMA) of a second access router;

wherein when the mobile node starts to move away from a current point of attachment with the first PMA but before the mobile node moves to a point of attachment with the second PMA, performing a pre-authentication phase in which the mobile node completes authentication while still in a first network of the first PMA, thereby reducing handover time;

wherein during said pre-authentication phase the first and second PMAs learn each other's IP addresses and a transient proactive handover tunnel is created between the first PMA and the second PMA, said proactive handover tunnel terminating upstream from said mobile node without extending to said mobile node; and further including deleting said proactive handover tunnel when said mobile node moves to the second PMA;

wherein prior to said pre-authentication phase a first PMIP tunnel is created between said first PMA and an LMA/HA, and wherein during said pre-authentication phase said pro-active handover tunnel co-exists with said first PMIP tunnel and a second PMIP tunnel is created between said second PMA and an LMA/HA.

2. The method of claim 1, further including having said first proxy mobile agent and said second proxy agent located in a same domain for intra-domain handover.

3. The method of claim 1, further including having said first proxy mobile agent and said second proxy agent located in a different domains for inter-domain handover.

4. The method of claim 1, wherein as part of an initial access authentication, the mobile node performs EAP by communicating with a local layer authentication agent and an AAA server.

5. The method of claim 1, wherein said mobile node performs direct authentication in which it communicates with the second PMA directly.

6. The method of claim 1, wherein said mobile node performs indirect authentication in which it communicates via the first PMA as a pass-through and acts as a proxy.

7. The method of claim 1, wherein the mobile node initially discovers network elements of the first PMAs network, including IP address of the access router of the second PMA.

8. The method of claim 1, wherein after said tunnel is created between the first PMA and the second PMA during the authentication phase, the second PMA sends a proxy binding update to an LMA/HA on behalf of the mobile.

9. The method of claim 8, wherein after the second PMA sends a proxy binding update to the LMA/HA, another tunnel is created between the LMA/HA and the second PMA.

10. The method of claim 9, wherein the mobile deletes the tunnel between the first PMA and the second PMA when it moves to the second PMA.

11. The method of claim 10, wherein when the mobile node moves to the second PMA, the mobile node changes its default router, but because pre-authentication and binding update have been performed, the mobile does not go through access authentication.

12. The method of claim 3, wherein the first PMA has a first LMA/HA and the second PMA has a different second LMA/HA and, thus, send different home prefixes as part of their router advertisement.

13. The method of claim 12, wherein after the second PMA sends a proxy binding update to the second LMA/HA, a tunnel is created between the second LMA/HA and the second PMA.

14. The method of claim 12, wherein a proxy binding update is sent to the first LMA/HA, and a tunnel is created between the first LMA/HA and the first PMA.

15. The method of claim 12, wherein the mobile node sends a binding update to the first LMA/HA.

16. The method of claim 15, wherein the mobile node is equipped with a client MIPv6.

17. A system for optimizing handover in a PMIPv6 environment of a mobile node between access routers having proxy mobile agents (PMA) located within at least one localized mobility management domain having a corresponding localized mobility anchor (LMA/HA), comprising:

a mobile node equipped with a client MIPv6 and configured to perform media-independent pre-authentication (MPA) supporting fast-handoff of the mobile node between a first proxy mobile agent (PMA) of a first access router and a second proxy mobile agent (PMA) of a second access router;

said mobile node being configured such that when the mobile node starts to move away from a current point of attachment with the first PMA but before the mobile node moves to a point of attachment with the second PMA, the mobile node performs a pre-authentication phase in which the mobile node completes authentication while still in a first network of the first PMA, thereby reducing handover time;

wherein during said pre-authentication phase the first and second PMAs learn each other's IP addresses and a transient proactive handover tunnel is created between the first PMA and the second PMA, said proactive handover tunnel terminating upstream from said mobile node without extending to said mobile node;

further including said system being configured to delete said proactive handover tunnel when said mobile node moves to the second PMA; and wherein prior to said pre-authentication phase a first PMIP tunnel is created between said first PMA and an LMA/HA, and wherein during said pre-authentication phase said pro-active handover tunnel co-exists with said first PMIP tunnel and a second PMIP tunnel is created between said second PMA and an LMA/HA.

18. The system of claim 17, wherein after said tunnel is created between the first PMA and the second PMA during the authentication phase, the second PMA sends a proxy binding update to an LMA/HA on behalf of the mobile.

19. The system of claim 18, wherein after the second PMA sends a proxy binding update to the LMA/HA, another tunnel is created between the LMA/HA and the second PMA.

20. The system of claim 19, wherein the mobile is configured to delete the tunnel between the first PMA and the second PMA when it moves to the second PMA.

21. The method of claim 1, wherein said step of deleting said tunnel when said mobile node moves to the second PMA includes said mobile node deleting said tunnel before said mobile node moves to the second PMA.

22. The method of claim 2, wherein said step of deleting said tunnel when said mobile node moves to the second PMA includes said mobile node deleting said tunnel before said mobile node moves to the second PMA.

23. The system of claim 17, further including said mobile node being configured to delete said tunnel before said mobile node moves to the second PMA.

* * * * *

UNITED STATES PATENT AND TRADEMARK OFFICE
CERTIFICATE OF CORRECTION

| | | |
|---|---|---|
| PATENT NO. | : 8,446,875 B2 | Page 1 of 1 |
| APPLICATION NO. | : 11/972621 | |
| DATED | : May 21, 2013 | |
| INVENTOR(S) | : Taniuchi et al. | |

It is certified that error appears in the above-identified patent and that said Letters Patent is hereby corrected as shown below:

In the Drawings

In Fig. 4(a), Sheet 5 of 24, delete "TUNEL CREATE" and insert -- TUNNEL CREATE --, therefor.

In the Specification

In Column 9, Line 48, delete "-kemPf-" and insert -- -kempf- --, therefor.

In Column 14, Line 30, delete "MA" and insert -- AAA --, therefor.

In Column 14, Line 40, delete "nPM" and insert -- nPAA --, therefor.

In Column 15, Line 4, delete ">HoA" and insert -- >HoA. --, therefor.

Signed and Sealed this
Twenty-fifth Day of November, 2014

Michelle K. Lee
*Deputy Director of the United States Patent and Trademark Office*